US009544725B2

(12) United States Patent
Han et al.

(10) Patent No.: US 9,544,725 B2
(45) Date of Patent: Jan. 10, 2017

(54) METHOD FOR DETERMINING POSITION OF USER EQUIPMENT AND APPARATUS FOR PERFORMING SAME IN WIRELESS MOBILE COMMUNICATION SYSTEM

(71) Applicant: LG ELECTRONICS INC., Seoul (KR)

(72) Inventors: Seung Hee Han, Anyang-si (KR); Jae Hoon Chung, Anyang-si (KR); Yeong Hyeon Kwon, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 14/478,985

(22) Filed: Sep. 5, 2014

(65) Prior Publication Data

US 2014/0376397 A1 Dec. 25, 2014

Related U.S. Application Data

(63) Continuation of application No. 13/260,243, filed as application No. PCT/KR2010/002163 on Apr. 8, 2010, now Pat. No. 8,862,157.
(Continued)

(30) Foreign Application Priority Data

Mar. 19, 2010 (KR) .................. 10-2010-0024715

(51) Int. Cl.
*H04L 12/26* (2006.01)
*H04W 4/02* (2009.01)
(Continued)

(52) U.S. Cl.
CPC .............. *H04W 4/02* (2013.01); *G01S 1/042* (2013.01); *G01S 1/20* (2013.01); *G01S 5/06* (2013.01);
(Continued)

(58) Field of Classification Search
None
See application file for complete search history.

(56) References Cited

U.S. PATENT DOCUMENTS

2005/0136845 A1 6/2005 Masuoka et al.
2005/0288033 A1 12/2005 McNew et al.
(Continued)

FOREIGN PATENT DOCUMENTS

JP 2012514908 6/2012
JP 2012523183 9/2012
(Continued)

OTHER PUBLICATIONS

Ericsson, "Reference Signals for Low Interference Subframes in Downlink", R1-091314, 3GPP TSG RAN WG1 Meeting #56bis, Mar. 23, 2009.
(Continued)

*Primary Examiner* — Michael J Moore, Jr.
(74) *Attorney, Agent, or Firm* — Lee Hong Degerman Kang & Waimey

(57) ABSTRACT

The present invention relates to a method for determining position of a user equipment in a wireless mobile communication system. The method comprises receiving a plurality of subframes including reference signals for positioning of the user equipment from a plurality of base stations periodically with a predetermined period of time; and determining position of the user equipment using reference signal time difference (RSTD) between the reference signals for positioning of the user equipment included in the received plurality of subframes, wherein a pattern of the reference signals for positioning of the user equipment is generated by repeating a diagonal mother matrix with dimension of 6×6, the pattern of the reference signals are mapped to orthogonal frequency division multiplexing (OFDM) symbols of the subframe, and the reference signals for positioning of the
(Continued)

user equipment in a OFDM symbol in which common reference signal (CRS) is transmitted are punctured.

9 Claims, 36 Drawing Sheets

Related U.S. Application Data

(60) Provisional application No. 61/168,356, filed on Apr. 10, 2009, provisional application No. 61/219,403, filed on Jun. 23, 2009.

(51) Int. Cl.
*G01S 1/04* (2006.01)
*G01S 1/20* (2006.01)
*G01S 5/10* (2006.01)
*H04L 27/26* (2006.01)
*G01S 5/06* (2006.01)
*H04W 64/00* (2009.01)

(52) U.S. Cl.
CPC ............. *G01S 5/10* (2013.01); *H04L 27/2601* (2013.01); *H04W 64/00* (2013.01)

(56) References Cited

U.S. PATENT DOCUMENTS

| | | | |
|---|---|---|---|
| 2008/0132247 A1 | 6/2008 | Anderson | |
| 2010/0034312 A1* | 2/2010 | Muharemovic | H04L 27/2613 375/267 |
| 2010/0080154 A1* | 4/2010 | Noh | H04B 7/0452 370/310 |
| 2010/0081451 A1* | 4/2010 | Mueck | G01S 5/0045 455/456.1 |
| 2010/0260154 A1* | 10/2010 | Frank | G01S 5/10 370/336 |
| 2011/0286499 A1* | 11/2011 | Panicker | H04L 25/0204 375/148 |
| 2012/0002740 A1* | 1/2012 | Han | H04L 5/0048 375/260 |
| 2012/0027110 A1* | 2/2012 | Han | H04J 11/0079 375/260 |
| 2012/0108270 A1* | 5/2012 | Kazmi | H04W 64/00 455/456.5 |
| 2013/0065612 A1* | 3/2013 | Siomina | H04W 24/10 455/456.2 |
| 2014/0094188 A1* | 4/2014 | Kazmi | G01S 5/0242 455/456.1 |

FOREIGN PATENT DOCUMENTS

| | | |
|---|---|---|
| KR | 1020060087239 | 8/2006 |
| KR | 100625431 | 9/2006 |
| WO | 2008033117 | 3/2008 |
| WO | 2008130816 | 10/2008 |
| WO | 2010/117116 | 10/2010 |

OTHER PUBLICATIONS

Nortel, "LTE neighbor cell hearability", R1-090765, 3GPP TSG RAN1 #56, Feb. 6, 2009.

Alcatel-Lucent, "Improving the hearability of LTE Positioning Service", R1-090053, 3GPP TSG RAN WG1 #55bis, Jan. 8, 2009.

Motorola, "Study on hearability of reference signals in LTE positioning support", R1-091336, 3GPP TSG RAN1 #56bis, Mar. 18, 2009.

Qualcomm Europe, "On OTDOA in LTE," 3GPP TSG-RAN WG1 #55bis, R1-090353, Jan. 2009, 9 pages.

Catt, "Considerations on CQI-RS design for LTE-Advanced," 3GPP TSG RAN WG1 meeting #56bis, R1-091518, Mar. 2009, 7 pages.

NTT DoCoMo, "DL RS Design for LTE-Advanced," 3GPP TSG RAN WG1 Meeting #56bis, R1-091483, Mar. 2009, 7 pages.

LG Electronics, "Investigation on Positioning Support," 3GPP TSG RAN WG1 #57, R1-092107, May 2009, 10 pages.

Huawei, "Consideration on positioning support for LTE Rel-9", R1-091257, 3GPP TSG RAN WG1#56bis, Mar. 2009, 6 pages.

Qualcomm Europe, "Sequence Design for E-IPDL RS", R1-091445, 3GPP TSG RAN WG1#56bis, Mar. 2009, 2 pages.

Panasonic, "Precoded STS for LTE-Advanced," 3GPP TSG-RAN WG1 #56bis, R1-091172, Mar. 2009, 3 pages.

\* cited by examiner

Antenna port 5

Antenna port 5

| 1 | 3 | 2 | 5 | 0 | 4 |
|---|---|---|---|---|---|
| 2 | 4 | 3 | 0 | 1 | 5 |
| 3 | 5 | 4 | 1 | 2 | 0 |
| 4 | 0 | 5 | 2 | 3 | 1 |
| 5 | 1 | 0 | 3 | 4 | 2 |
| 0 | 2 | 1 | 4 | 5 | 3 |

| 0 | 4 | 1 | 3 | 2 | 5 |
|---|---|---|---|---|---|
| 1 | 5 | 2 | 4 | 3 | 0 |
| 2 | 0 | 3 | 5 | 4 | 1 |
| 3 | 1 | 4 | 0 | 5 | 2 |
| 4 | 2 | 5 | 1 | 0 | 3 |
| 5 | 3 | 0 | 2 | 1 | 4 |

| 5 | 3 | 4 | 1 | 0 | 2 |
|---|---|---|---|---|---|
| 4 | 2 | 3 | 0 | 5 | 1 |
| 3 | 1 | 2 | 5 | 4 | 0 |
| 2 | 0 | 1 | 4 | 3 | 5 |
| 1 | 5 | 0 | 3 | 2 | 4 |
| 0 | 4 | 5 | 2 | 1 | 3 |

| 1 | 2 | 9 | 3 | 5 | 0 | 8 | 4 | 7 | 6 |
| 2 | 3 | 0 | 4 | 6 | 1 | 9 | 5 | 8 | 7 |
| 3 | 4 | 1 | 5 | 7 | 2 | 0 | 6 | 9 | 8 |
| 4 | 5 | 2 | 6 | 8 | 3 | 1 | 7 | 0 | 9 |
| 5 | 6 | 3 | 7 | 9 | 4 | 2 | 8 | 1 | 0 |
| 6 | 7 | 4 | 8 | 0 | 5 | 3 | 9 | 2 | 1 |
| 7 | 8 | 5 | 9 | 1 | 6 | 4 | 0 | 3 | 2 |
| 8 | 9 | 6 | 0 | 2 | 7 | 5 | 1 | 4 | 3 |
| 9 | 0 | 7 | 1 | 3 | 8 | 6 | 2 | 5 | 4 |
| 0 | 1 | 8 | 2 | 4 | 9 | 7 | 3 | 6 | 5 |

Cell Specific RS

PCFICH/PHICH/PDCCH

FIG. 25

| 5 | 11 | 0 | 6 | 8 | 9 | 7 | 10 | 1 | 4 | 2 | 3 |
|---|---|---|---|---|---|---|---|---|---|---|---|
| 11 | 10 | 1 | 0 | 4 | 6 | 2 | 8 | 3 | 9 | 5 | 7 |
| 4 | 9 | 2 | 7 | 0 | 3 | 10 | 6 | 5 | 1 | 8 | 11 |
| 10 | 8 | 3 | 1 | 9 | 0 | 5 | 4 | 7 | 6 | 11 | 2 |
| 3 | 7 | 4 | 8 | 5 | 10 | 0 | 2 | 9 | 11 | 1 | 6 |
| 9 | 6 | 5 | 2 | 1 | 7 | 8 | 0 | 11 | 3 | 4 | 10 |
| 2 | 5 | 6 | 9 | 10 | 4 | 3 | 11 | 0 | 8 | 7 | 1 |
| 8 | 4 | 7 | 3 | 6 | 1 | 11 | 9 | 2 | 0 | 10 | 5 |
| 1 | 3 | 8 | 10 | 2 | 11 | 6 | 7 | 4 | 5 | 0 | 9 |
| 7 | 2 | 9 | 4 | 11 | 8 | 1 | 5 | 6 | 10 | 3 | 0 |
| 0 | 1 | 10 | 11 | 7 | 5 | 9 | 3 | 8 | 2 | 6 | 4 |
| 6 | 0 | 11 | 5 | 3 | 2 | 4 | 1 | 10 | 7 | 9 | 8 |

FIG. 26

| 3 | 5 | 11 | 0 | 6 | 8 | 9 | 7 | 10 | 1 | 4 | 2 |
|---|---|---|---|---|---|---|---|---|---|---|---|
| 7 | 11 | 10 | 1 | 0 | 4 | 6 | 2 | 8 | 3 | 9 | 5 |
| 11 | 4 | 9 | 2 | 7 | 0 | 3 | 10 | 6 | 5 | 1 | 8 |
| 2 | 10 | 8 | 3 | 1 | 9 | 0 | 5 | 4 | 7 | 6 | 11 |
| 6 | 3 | 7 | 4 | 8 | 5 | 10 | 0 | 2 | 9 | 11 | 1 |
| 10 | 9 | 6 | 5 | 2 | 1 | 7 | 8 | 0 | 11 | 3 | 4 |
| 1 | 2 | 5 | 6 | 9 | 10 | 4 | 3 | 11 | 0 | 8 | 7 |
| 5 | 8 | 4 | 7 | 3 | 6 | 1 | 11 | 9 | 2 | 0 | 10 |
| 9 | 1 | 3 | 8 | 10 | 2 | 11 | 6 | 7 | 4 | 5 | 0 |
| 0 | 7 | 2 | 9 | 4 | 11 | 8 | 1 | 5 | 6 | 10 | 3 |
| 4 | 0 | 1 | 10 | 11 | 7 | 5 | 9 | 3 | 8 | 2 | 6 |
| 8 | 6 | 0 | 11 | 5 | 3 | 2 | 4 | 1 | 10 | 7 | 9 |

| | | 11 | 0 | 6 | 8 | 9 | 7 | 10 | 1 | 4 | 2 |
|---|---|---|---|---|---|---|---|---|---|---|---|
| | | 10 | 1 | 0 | 4 | 6 | 2 | 8 | 3 | 9 | 5 |
| | | 9 | 2 | 7 | 0 | 3 | 10 | 6 | 5 | 1 | 8 |
| | | 8 | 3 | 1 | 9 | 0 | 5 | 4 | 7 | 6 | 11 |
| | | 7 | 4 | 8 | 5 | 10 | 0 | 2 | 9 | 11 | 1 |
| | | 6 | 5 | 2 | 1 | 7 | 8 | 0 | 11 | 3 | 4 |
| | | 5 | 6 | 9 | 10 | 4 | 3 | 11 | 0 | 8 | 7 |
| | | 4 | 7 | 3 | 6 | 1 | 11 | 9 | 2 | 0 | 10 |
| | | 3 | 8 | 10 | 2 | 11 | 6 | 7 | 4 | 5 | 0 |
| | | 2 | 9 | 4 | 11 | 8 | 1 | 5 | 6 | 10 | 3 |
| | | 1 | 10 | 11 | 7 | 5 | 9 | 3 | 8 | 2 | 6 |
| | | 0 | 11 | 5 | 3 | 2 | 4 | 1 | 10 | 7 | 9 |

Cell Specific RS

PCFICH/PHICH/PDCCH

FIG. 30

| | | 10 | 1 | 4 | 2 | 3 | 5 | 11 | 0 | 6 | 8 |
|---|---|---|---|---|---|---|---|---|---|---|---|
| | | 8 | 3 | 9 | 5 | 7 | 11 | 10 | 1 | 0 | 4 |
| | | 6 | 5 | 1 | 8 | 11 | 4 | 9 | 2 | 7 | 0 |
| | | 4 | 7 | 6 | 11 | 2 | 10 | 8 | 3 | 1 | 9 |
| | | 2 | 9 | 11 | 1 | 6 | 3 | 7 | 4 | 8 | 5 |
| | | 0 | 11 | 3 | 4 | 10 | 9 | 6 | 5 | 2 | 1 |
| | | 11 | 0 | 8 | 7 | 1 | 2 | 5 | 6 | 9 | 10 |
| | | 9 | 2 | 0 | 10 | 5 | 8 | 4 | 7 | 3 | 6 |
| | | 7 | 4 | 5 | 0 | 9 | 1 | 3 | 8 | 10 | 2 |
| | | 5 | 6 | 10 | 3 | 0 | 7 | 2 | 9 | 4 | 11 |
| | | 3 | 8 | 2 | 6 | 4 | 0 | 1 | 10 | 11 | 7 |
| | | 1 | 10 | 7 | 9 | 8 | 6 | 0 | 11 | 5 | 3 |

▨ Cell Specific RS
▨ PCFICH/PHICH/PDCCH

FIG. 31

| 10 | 8  | 4  | 9  | 6  | 0  | 1  | 3  | 7  | 2  | 5  | 11 |
| 11 | 9  | 5  | 10 | 7  | 1  | 2  | 4  | 8  | 3  | 6  | 0  |
| 0  | 10 | 6  | 11 | 8  | 2  | 3  | 5  | 9  | 4  | 7  | 1  |
| 1  | 11 | 7  | 0  | 9  | 3  | 4  | 6  | 10 | 5  | 8  | 2  |
| 2  | 0  | 8  | 1  | 10 | 4  | 5  | 7  | 11 | 6  | 9  | 3  |
| 3  | 1  | 9  | 2  | 11 | 5  | 6  | 8  | 0  | 7  | 10 | 4  |
| 4  | 2  | 10 | 3  | 0  | 6  | 7  | 9  | 1  | 8  | 11 | 5  |
| 5  | 3  | 11 | 4  | 1  | 7  | 8  | 10 | 2  | 9  | 0  | 6  |
| 6  | 4  | 0  | 5  | 2  | 8  | 9  | 11 | 3  | 10 | 1  | 7  |
| 7  | 5  | 1  | 6  | 3  | 9  | 10 | 0  | 4  | 11 | 2  | 8  |
| 8  | 6  | 2  | 7  | 4  | 10 | 11 | 1  | 5  | 0  | 3  | 9  |
| 9  | 7  | 3  | 8  | 5  | 11 | 0  | 2  | 6  | 1  | 4  | 10 |

METHOD FOR DETERMINING POSITION OF USER EQUIPMENT AND APPARATUS FOR PERFORMING SAME IN WIRELESS MOBILE COMMUNICATION SYSTEM

CROSS-REFERENCE TO RELATED APPLICATIONS

This application is a continuation of U.S. application Ser. No. 13/260,243, filed on Oct. 24, 2011, now U.S. Pat. No. 8,862,157, which is the National Stage filing under 35 U.S.C. §371 of International Application No. PCT/KR2010/002163, filed on Apr. 8, 2010, which claims the benefit of earlier filing date and right of priority to Korean Application No. 10-2010-0024715, filed on Mar. 19, 2010, and also claims the benefit of U.S. Provisional Application Nos. 61/168,356, filed on Apr. 10, 2009 and 61/219,403, filed on Jun. 23, 2009, the contents of which are all hereby incorporated by reference herein in their entirety.

TECHNICAL FIELD

The present invention relates to a method for determining the position of user equipment and an apparatus for performing the same in a wireless mobile communication system.

BACKGROUND ART

LTE Physical Structure

3GPP (3$^{rd}$ Generation Project Partnership) LTE (Long Term Evolution) supports a type 1 radio frame structure applicable to FDD (Frequency Division Duplex) and a type 2 radio frame structure applicable to TDD (Time Division Duplex).

FIG. 1 shows the structure of a type 1 radio frame. The type 1 radio frame includes ten subframes, and one subframe consists of two slots.

FIG. 2 shows the structure of a type 2 radio frame. The type 2 radio frame includes two half frames, and each half frame is composed of five subframes, a downlink pilot time slot DwPTS, a guard period GP, and an uplink pilot time slot UpPTS. One subframe includes two slots. The DwPTS is used for initial cell search, synchronization or channel estimation in user equipment. The UpPTS is used for channel estimation in a base station and uplink transmission synchronization of the user equipment. The guard period is used to remove interference generated on an uplink due to multi-path delay of a downlink signal between the uplink and downlink. One subframe consists of two slots irrespective of radio frame type.

FIG. 3 shows a slot structure of an LTE downlink. As shown in FIG. 3, a signal transmitted in each slot may be represented by a resource grid composed of $N_{RB}^{DL} N_{sc}^{RB}$ subcarriers and $N_{symb}^{DL}$ OFDN (Orthogonal Frequency Division Multiplexing) symbols. Here, $N_{RB}^{DL}$ represents the number of resource blocks (RBs) on the downlink, $N_{sc}^{RB}$ represents the number of subcarriers constructing one RB, and $N_{symb}^{DL}$ represents the number of OFDM symbols in one downlink slot.

FIG. 4 shows a slot structure of an LTE uplink.

As shown in FIG. 4, a signal transmitted in each slot may be represented by a resource grid composed of $N_{RB}^{UL} N_{SC}^{RB}$ subcarriers and $N_{symb}^{UL}$ OFDM symbols. Here, $N_{RB}^{UL}$ represents the number of RBs on the uplink, $N_{SC}^{RB}$ represents the number of subcarriers constructing one RB, and $N_{symb}^{UL}$ represents the number of OFDM symbols in one uplink slot.

A resource element is a resource unit defined by indexes (a, b) in the uplink slot and downlink slot and represents one subcarrier and one OFDM symbol. Here, a is an index in the frequency domain and b is an index in the time domain.

FIG. 5 shows the structure of a downlink subframe. Referring to FIG. 5, a maximum of three OFDM symbols located at the front of the first slot in one subframe correspond to a control region allocated to a control channel. The remaining OFDM symbols correspond to a data region allocated to a physical downlink shared channel (PDSCH). Examples of a downlink control channel used in the 3GPP LTE include PCFICH (Physical Control Format Indicator Channel), PDCCH (Physical Downlink Control Channel), PHICH (Physical Hybrid ARQ Indicator Channel), etc.

Definition of Multi-Antenna (MIMO) Technology

MIMO (Multi-Input Multi-Output) is a method capable of improving transmission and reception data efficiency by using multiple transmission antennas and multiple receiving antennas. That is, MIMO is a technique that increases capacity or improve performance using multiple antennas at a transmitter or a receiver of a wireless communication system. The MIMO is referred to as multi-antenna hereinafter.

A multi-antenna technology is an application of a technique that collects data fragments received through multiple antennas to accomplish a message instead of receiving the message through a single antenna path. The multi-antenna technology is considered to be a next-generation mobile communication technology which can be widely used for mobile communication terminals and relays because the multi-antenna technology can improve a data transfer rate in a specific range or increase a system range for a specific data transfer rate. Furthermore, the multi-antenna technology is attracting attention as a next-generation technology capable of overcoming the limitation of mobile communication transmission capacity that has reached the limit due to extension of data communication.

FIG. 6 shows a configuration of a conventional MIMO communication system. As shown in FIG. 6, when the number of transmission antennas and the number of receiving antennas are simultaneously increased to $N_T$ and $N_R$ respectively, a channel transmission capacity increases in proportion to the number of antennas in theory, distinguished from a case in which only transmitter or receiver uses multiple antennas. Accordingly, a transmission rate and frequency efficiency can be improved. The transmission rate can be increased by the product of a maximum transmission rate $R_0$ when a single antenna is used and a rate of increase $R_i$ represented by Equation 1 according to increase in the channel transmission capacity theoretically.

$$R_i = \min(N_T, N_R) \qquad [\text{Equation 1}]$$

For example, a MIMO communication system using four transmission antennas and four receiving antennas can acquire a transmission rate four times the transmission rate of a single antenna system in theory. Since the theoretical capacity increase of the multi-antenna system was proved in the mid-90s, various techniques for improving a data transfer rate have been actively studied and some of the techniques are reflected in standards of wireless communications such as 3$^{rd}$ generation mobile communication and next-generation wireless LAN.

MIMO related researches that have been performed so far involve information theory researches related to MIMO communication capacity calculation in various channel environments and multi-access environments, researches on radio channel measurement and modeling, researches on space-time signal processing techniques for improving transmission reliability and transmission rate, etc.

Channel Estimation

In a wireless communication system environment, fading occurs due to multi-path delay. A process of compensating for a signal distortion caused by an abrupt environment variation due to fading so as to restore a transmission signal is referred to as channel estimation. The channel estimation is performed using a signal that both a transmitter and a receiver know, in general. The signal known to both the transmitter and receiver is referred to as a pilot signal or a reference signal (RS).

In a wireless communication system using OFDM transmission method, the reference signal is allocated to all subcarriers or allocated between data subcarriers.

To obtain channel estimation performance gain, a symbol composed of a reference signal only, such as a preamble signal, is used. When the symbol is used, channel estimation performance can be improved, compared to a method of allocating a reference signal between data subcarriers, since the reference signal has a high density generally. In this case, however, data traffic decreases. To increase the data traffic, a method of allocating the reference signal between data subcarriers is used. When this method is used, the density of the reference signal is reduced so as to deteriorate channel estimation performance. Accordingly, appropriate arrangement for minimizing the channel estimation performance deterioration is required.

The receiver performs channel estimation using a reference signal through the following process. The receiver estimates channel information between the receiver and the transmitter from a received signal since the receiver knows information on the reference signal. The receiver can correctly demodulate data transmitted from the transmitter using an estimated channel information value.

When the reference signal transmitted from the transmitter is p, channel information to which the reference signal is subjected while being transmitted is h, thermal noise generated in the receiver is n, and a signal received by the receiver is y, the received signal y can be represented by y=h·p+n. Here, since the receiver knows the reference signal p, channel information $\hat{h}$ can be estimated using the reference signal p as expressed by Equation 2.

$$\hat{h}=y/p=h+n/p=h+n \quad \text{[Equation 2]}$$

Here, the accuracy of the channel estimation value $\hat{h}$ obtained using the reference signal p is determined based on $\hat{n}$. Accordingly, $\hat{n}$ needs to converge on 0 in order to estimate accurate $\hat{h}$, and thus it is necessary to perform channel estimation using a large number of reference signals. If a channel is estimated using a large number of reference signals, the influence of $\hat{n}$ can be minimized.

User Specific Reference Signal Allocation Method in 3GPP LTE Downlink System

Among the above-described radio frame structures supported b 3GPP LTE, the structure of the radio frame applicable to FDD is described in detail. One frame is transmitted for 10 msec. One frame includes ten subframes. One subframe is transmitted for 1 msec.

One subframe is composed of 14 or 12 OFDM (Orthogonal Frequency Division Multiplexing) symbols, and one OFDM symbol uses 128, 256, 512, 1024, 1536, or 2048 sub carriers.

FIG. 7 shows the structure of a user equipment (UE)-specific downlink reference signal in a subframe using normal cyclic prefix (CP), in which one TTI (Transmission Time Interval) has 14 OFDM symbols. In FIG. 7, R5 represents a UE-specific reference signal and l represents the location of an OFDM symbol on the subframe.

FIG. 8 shows the structure of a UE-specific downlink reference signal in a subframe using extended cyclic prefix (CP), in which one TTI has 12 OFDM symbols.

FIGS. 9, 10 and 11 respectively show structures of UE-common downlink reference signals for systems respectively having 1, 2 and 4 transmission antennas when 1 TTI has 14 OFDM symbols. In FIGS. 9, 10 and 11, R0, R1, R2 and R3 respectively represent pilot symbols for transmission antenna 0, transmission antenna 1, transmission antenna 2 and transmission antenna 3. A subcarrier to which the pilot symbol of each transmission antenna is used doe not carry a signal in order to remove interference of all transmission antennas other than the transmission antenna transmitting the pilot symbol.

The UE-specific downlink reference signals shown in FIGS. 7 and 8 can be used simultaneously with the UE-common downlink reference signals shown in FIGS. 9, 10 and 11. For example, OFDM symbols 0, 1 and 2 of a first slot transmitting control information can use the UE-common downlink reference signals shown in FIGS. 9, 10 and 11 and the remaining OFDM symbols can use the UE-specific downlink reference signals.

Meantime, a downlink reference signal for each cell can be multiplied by a pre-defined sequence (for example, Pseudo-random (PN), m-sequence, etc.) and transmitted so as to reduce signal interference of a pilot symbol received from a neighboring cell at the receiver to thereby improve channel estimation performance. A PN sequence is applied based on OFDM symbols in one subframe. The PN sequence may be applied differently depending on cell ID, subframe number, OFDM symbol location, and user equipment ID.

For example, in the case of the structure of 1Tx pilot symbol of FIG. 9, two pilot symbols of one transmission antenna are used for a specific OFDM symbol including pilot symbols. 3GPP LTE systems include a system having several bandwidths such as 6 RBs (resource blocks) to 110 RBs. Accordingly, the number of pilot symbols of one transmission antenna in one OFDM symbol including pilot symbols is $2 \times N_{RB}$, and the sequence multiplied by the downlink reference signal for each cell needs to have a length of $2 \times N_{RB}$. Here, $N_{RB}$ represents the number of RBs depending on bandwidth and the sequence may use a binary sequence or a complex sequence. The following Equation 3 shows an example of the complex sequence.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 3]}$$
$$m = 0, 1, \ldots, 2N_{RB}^{max} - 1$$

Here, $N_{RB}^{max}$ denotes the number of RBs corresponding to a maximum bandwidth, which may be determined as 110 according to the above explanation, and C denotes a PN sequence which can be defined as Gold sequence of length-31. For the UE-specific downlink reference signals, Equation 3 can be represented as Equation 4.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 4]}$$
$$m = 0, 1, \ldots, 2N_{RB}^{PDSCH} - 1$$

In Equation 4, $N_{RB}^{PDSCH}$ denotes the number of RBs corresponding to downlink data allocated to specific user equipment. Accordingly, a sequence length may depend on the quantity of data allocated to user equipment.

The above-described UE-specific downlink reference signal structures can transmit only one data stream, and cannot transmit a plurality of streams because they cannot be simply extended. Accordingly, the UE-specific downlink reference signal structures need to be extended to transmit a plurality of data streams.

User Equipment Positioning Method

The necessity of user equipment positioning increases for many operations due to various applications in real life. Widely known user equipment positioning methods may be classified into a GPS (Global Positioning System) based method and a terrestrial positioning based method.

The GPS based method detects the position of a user equipment using satellites. The GPS base method requires signals received from at least four satellites and it cannot be used in indoor environments.

The terrestrial positioning based method detects the position of user equipment using a timing difference between signals from base stations. The terrestrial positioning based method requires signals received from at least three base stations. The terrestrial positioning based method can be used in almost all environments although it has position estimation performance lower than that of the GPS based method. The terrestrial positioning based method estimates the position of user equipment using a synchronization signal or a reference signal mostly. The terrestrial positioning based method is defined by the following terms for each standard.

The terrestrial positioning based method is defined as OTDOA (Observed Time Difference Of Arrival) in UTRAN (UMTS Terrestrial Radio Access Network), as E-OTD (Enhanced Observed Time Difference) in GERAN (GSM/EDGE Radio Access Network), and as AFLT (Advanced Forward Link Trilateration) in CDMA 2000.

FIG. 12 illustrates an exemplary downlink OTDOA which is a kind of the terrestrial positioning based method, used in 3GPP standard. Since user equipment generates a reference clock signal on the basis of subframes transmitted from a current serving cell, signals received from neighboring cells have different TDOAs. Here, the TDOA can be measured using a positioning signal of the user equipment, and thus it can be referred to as a RSTD (Reference Signal Time Difference).

FIG. 13 illustrates an example of a user equipment positioning method using OTDOA. The position of the user equipment can be calculated by solving a linear equation using Taylor series expansion (refer to Y. Chan and K. Ho, "A simple and efficient estimator for hyperbolic location," IEEE Trans. Signal Processing, vol. 42, pp. 1905-1915, August 1994).

The above-mentioned user equipment positioning method can be performed using a common reference signal (CRS) or a primary synchronization signal/secondary synchronization signal (PSS/SSS), however, it is difficult to satisfy requirements of superior performance and operator only using the CRS or PSS/SSS.

Accordingly, it is necessary to introduce a measurement reference signal for LCS (Location Service). Here, the horizontal axis may represent an OFDM symbol index and the vertical axis may represent a frequency index or subcarrier index.

FIGS. 14 and 15 show structures of subframes including RSs for LCS for OTDOA. FIG. 14 shows a normal CP case and FIG. 15 shows an extended CP case. In FIGS. 14 and 15, an E-IPDL (Evolved-Idle Period Downlink) RS corresponds to an RS for LCS. The RS for LCS may be referred to as a PRS (Positioning Reference Signal).

In FIGS. 14 and 15, the horizontal axis may represent an OFDM symbol index and the vertical axis may represent a frequency index or subcarrier index. As shown in FIGS. 14 and 15, E-IPDL RSs have a diagonal matrix form in one cell. The E-IPDL RSs are evenly distributed in one subframe. That is, if E-IPDL RS elements are combined in one subframe, all of the E-IPDL RSs are transmitted in the entire resource elements. Here, the E-IPDL RSs may be transmitted in a specific resource unit (frequency X symbol) only, or uniformly transmitted over the overall band.

In another cell, E-IPDL RSs may be circularly shifted one by one on the frequency axis and transmitted. In this case, if E-IPDL RSs transmitted by two cells are perfectly synchronized with each other and received, the position of user equipment can be measured without collision between the cells. That is, E-IPDL RS patterns for the cells are configured differently such that the position of the user equipment can be measured without collision of RSs between the cells. Here, collision means a case in which the same RS signal patterns are located on the same time and frequency resources on subframes transmitted from two cells and interfere each other.

The above-mentioned user equipment positioning method can be performed using a synchronization signal or a CRS. A user equipment position estimation error is proportional to the bandwidth occupied by a transmitted synchronization signal or reference signal. In other words, timing resolution increases as bandwidth increases, in general. Accordingly, RS measurement is performed through the following two steps.

(1) First step of performing symbol timing acquisition through a synchronization signal (2) Second step of time resolution through an RS However, if the user equipment is located very close to a serving cell, the user equipment may not recognize a signal of the neighbor cell because the signal of the neighbor cell becomes less than the granularity of quantization of an analog-to-digital converter (ADC) due to strong power of the serving cell. That is, a hearibility problem may be generated.

To solve this problem, UTRA standard provides IPDL (Idle Period Downlink) technique that interrupts transmission of all channels of the serving cell. Generally, the frequency of an idle period is one slot (approximately 667 μs) per 100 ms (that is, approximately 0.7%). During the idle period, the user equipment can receive a pilot signal of a neighbor cell even if a signal with high intensity is received from the serving cell in the same frequency band. Furthermore, a signal of the serving cell can be measured more accurately through an idle period of a first best neighbor cell signal.

Even in this case, however, the conventional synchronization signal and CRS(Common Reference Signal)/DRS (Dedicated Reference Signal) need to be transmitted for other user equipments, and thus user equipment positioning performance may be deteriorated when these signals are transmitted.

Moreover, in the structures of FIGS. 14 and 15, LCS RSs transmitted from multiple cells may be received without being synchronized.

FIG. 16 illustrates a state that LCS RSs transmitted from multiple cells are received without being synchronized. When the LCSs RSs are received without being synchronized, as shown in FIG. 16, the possibility of collision of RSs of all cells increases in the case of a diagonal structure. On the assumption that FIG. 16 corresponds to a normal CP case, if cells A and B transmit different RS patterns and user equipment receives the RS patterns with an offset corresponding to one OFDM symbol, collision between RSs may occur. In this case, collision occurs in every RE, and thus measurement performance is deteriorated even if different sequences are used.

This problem is not limited to the LCS RS only and may be generated in the normal RS and CoMP (Coordinated Multi-Point) RS.

DISCLOSURE

Technical Problem

An object of the present invention devised to solve the problem lies on a RS structure capable of preventing collision between RSs received from multiple cells when the RSs are received without being synchronized.

It will be appreciated by person skilled in the art that the objects that could be achieved with the present invention are not limited to what has been particularly described hereinabove and the above and other objects that the present invention could achieve will be more clearly understood from the following detailed description.

Technical Solution

The objects of the present invention can be achieved by providing a method for determining position of a user equipment in a wireless mobile communication system, the method comprising receiving a plurality of subframes including reference signals for positioning of the user equipment from a plurality of base stations periodically with a predetermined period of time; and determining position of the user equipment using reference signal time difference (RSTD) between the reference signals for positioning of the user equipment included in the received plurality of subframes, wherein a pattern of the reference signals for positioning of the user equipment is generated by repeating a diagonal mother matrix with dimension of 6×6, the pattern of the reference signals are mapped to orthogonal frequency division multiplexing (OFDM) symbols of the subframe, and the reference signals for positioning of the user equipment in a OFDM symbol in which common reference signal (CRS) is transmitted are punctured.

The mother matrix may be generated using a Costas array.

For a subframe with normal cyclic prefix, an OFDM symbol having a lowest time index is numbered as 0th OFDM symbol, maximum 3 OFDM symbols from the 0th OFDM symbol are used for a control channel, 3rd and higher OFDM symbols are used for the pattern of the reference signals for positioning of the user equipment For a subframe with extended cyclic prefix, an OFDM symbol having a lowest time index is numbered as 0th OFDM symbol, maximum 3 OFDM symbols from the 0th OFDM symbol are used for a control channel, 4th and higher OFDM symbols are used for the pattern of the reference signals for positioning of the user equipment.

The pattern of the reference signals for positioning of the user equipment is shifted in a frequency axis for each cell.

In accordance with another aspect of the present invention, a method for determining position of a user equipment in a wireless mobile communication system, the method comprises receiving a plurality of subframes including reference signals for positioning of the user equipment from a plurality of base stations periodically with a predetermined period of time; and determining position of the user equipment using reference signal time difference (RSTD) between the reference signals for positioning of the user equipment included in the received plurality of subframes, wherein a pattern of the reference signals for positioning of the user equipment is generated from a mother matrix, at least one row or column of the mother matrix is punctured.

0th, 2nd, 5th and 9th columns of the mother matrix are punctured for a subframe with normal cyclic prefix, and wherein 0th, 1st, 2nd, 3rd, 6th and 9th columns of the mother matrix are punctured for a subframe with extended cyclic prefix.

The pattern of the reference signals for positioning of the user equipment is generated by circular shift of row or column of the mother matrix.

The mother matrix may be generated using a Costas array.

The mother matrix has a dimension smaller than a number of subcarriers of the subframe, and wherein the pattern of the reference signals included in the subframe transmitted from each of the plurality of the base stations is generated from a matrix circularly shifted of the mother matrix.

In accordance with another aspect of the present invention, a user equipment in a wireless mobile communication system, comprises a receiver receiving a plurality of subframes including reference signals for positioning of the user equipment from a plurality of base stations periodically with a predetermined period of time; and a processor electrically connected to the receiver and determining position of the user equipment using reference signal time difference (RSTD) between the reference signals for positioning of the user equipment included in the received plurality of subframes, wherein a pattern of the reference signals for positioning of the user equipment is generated by repeating a diagonal mother matrix with dimension of 6×6, the pattern of the reference signals are mapped to orthogonal frequency division multiplexing (OFDM) symbols of the subframe, and the reference signals for positioning of the user equipment in a OFDM symbol in which common reference signal (CRS) is transmitted are punctured.

The mother matrix may be generated using a Costas array.

For a subframe with normal cyclic prefix, an OFDM symbol having a lowest time index is numbered as 0th OFDM symbol, maximum 3 OFDM symbols from the 0th OFDM symbol are used for a control channel, 3rd and higher OFDM symbols are used for the pattern of the reference signals for positioning of the user equipment.

For for a subframe with extended cyclic prefix, an OFDM symbol having a lowest time index is numbered as 0th OFDM symbol, maximum 3 OFDM symbols from the 0th OFDM symbol are used for a control channel, 4th and higher OFDM symbols are used for the pattern of the reference signals for positioning of the user equipment.

The pattern of the reference signals for positioning of the user equipment is shifted in a frequency axis for each cell.

Advantageous Effects

According to embodiments of the present invention, the position of user equipment can be determined smoothly even when reference signals for user equipment position determination are received without being synchronized from different cells.

It will be appreciated by persons skilled in the art that the effects that could be achieved with the present invention are not limited to what has been particularly described hereinabove and other advantages of the present invention will be more clearly understood from the following detailed description.

DESCRIPTION OF DRAWINGS

FIG. 25 shows a result of circular shift of the matrix shown in FIG. 22 by 2 to the right in a normal CP case;
FIG. 26 shows a result of circular shift of the matrix shown in FIG. 22 by 3 to the right in an extended CP case;
FIG. 30 shows an example of puncturing performed with the first column of a mother matrix having N=12 located on the last CRS symbol of a MBSFN subframe;
FIG. 31 shows an example of a Costas array with N=12;

BEST MODE FOR CARRYING OUT THE INVENTION

Figure 1:
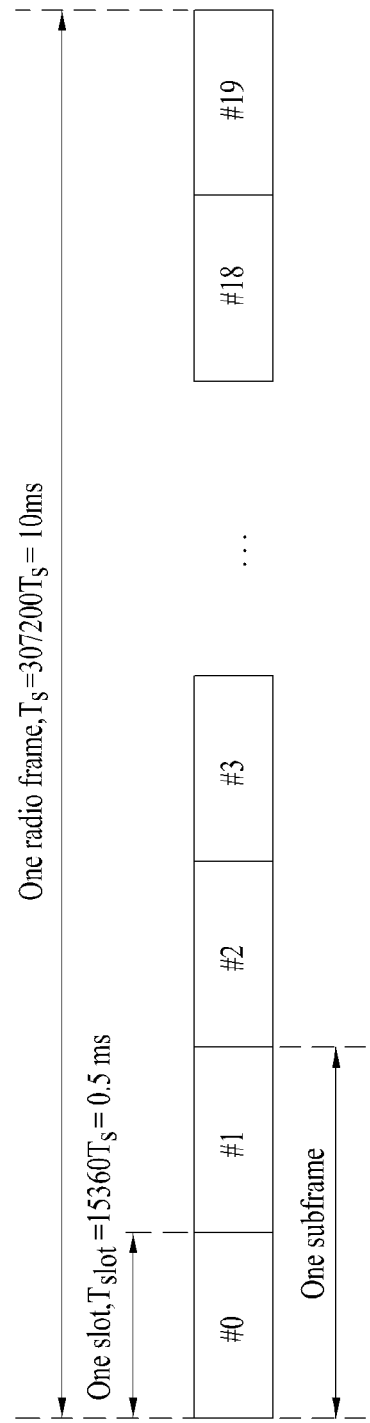
FIG. 1 shows the structure of a type 1 radio frame.
Figure 2:
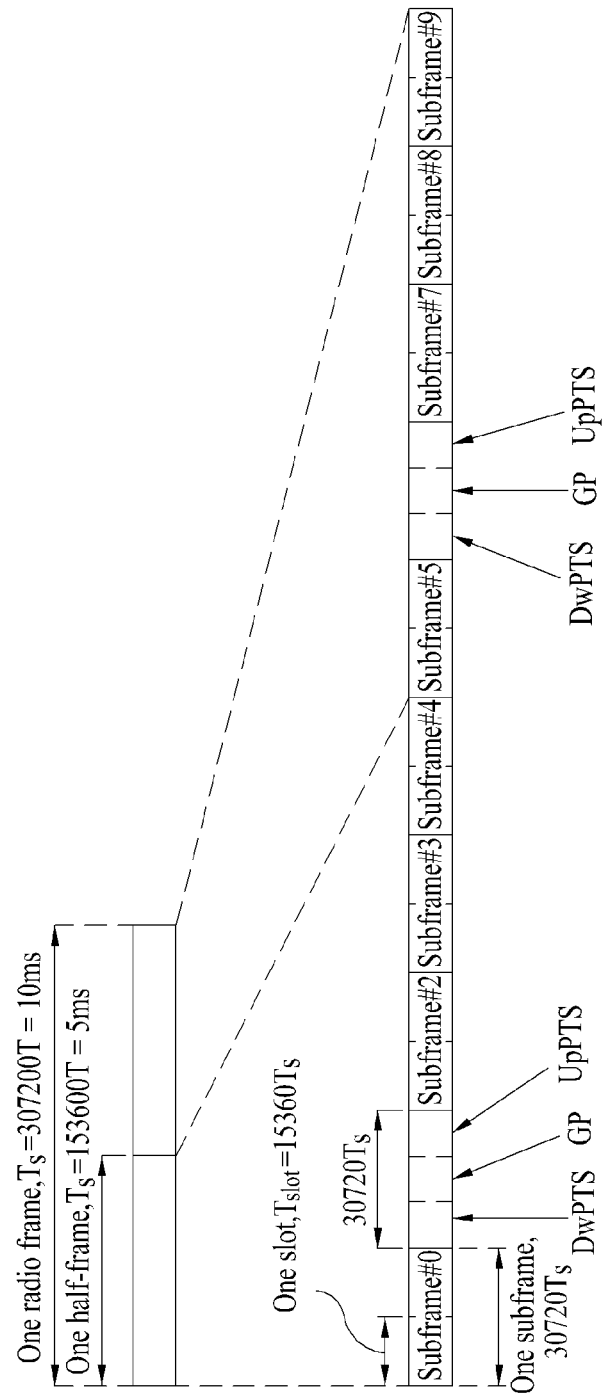
FIG. 2 shows the structure of a type 2 radio frame.
Figure 3:
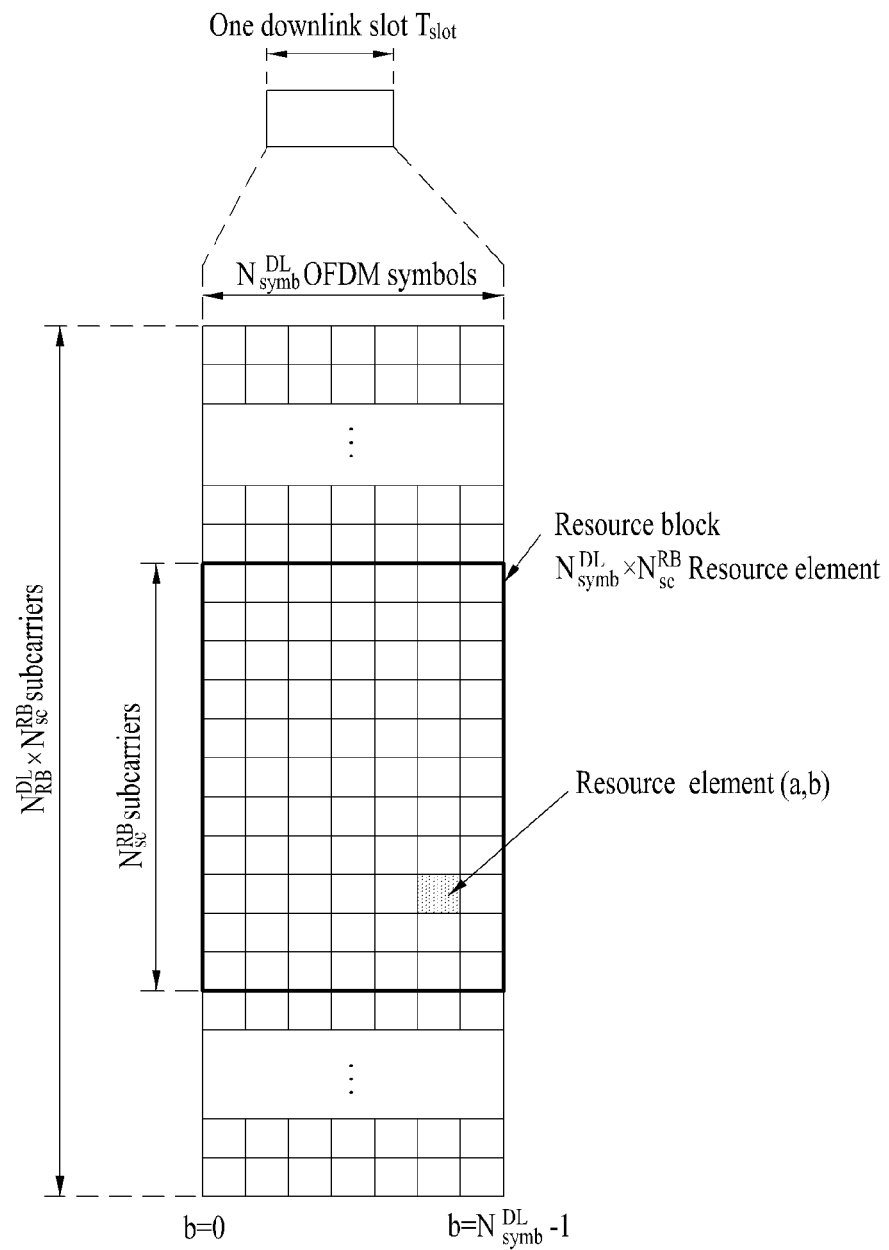
FIG. 3 shows the structure of a LTE downlink slot.
Figure 4:
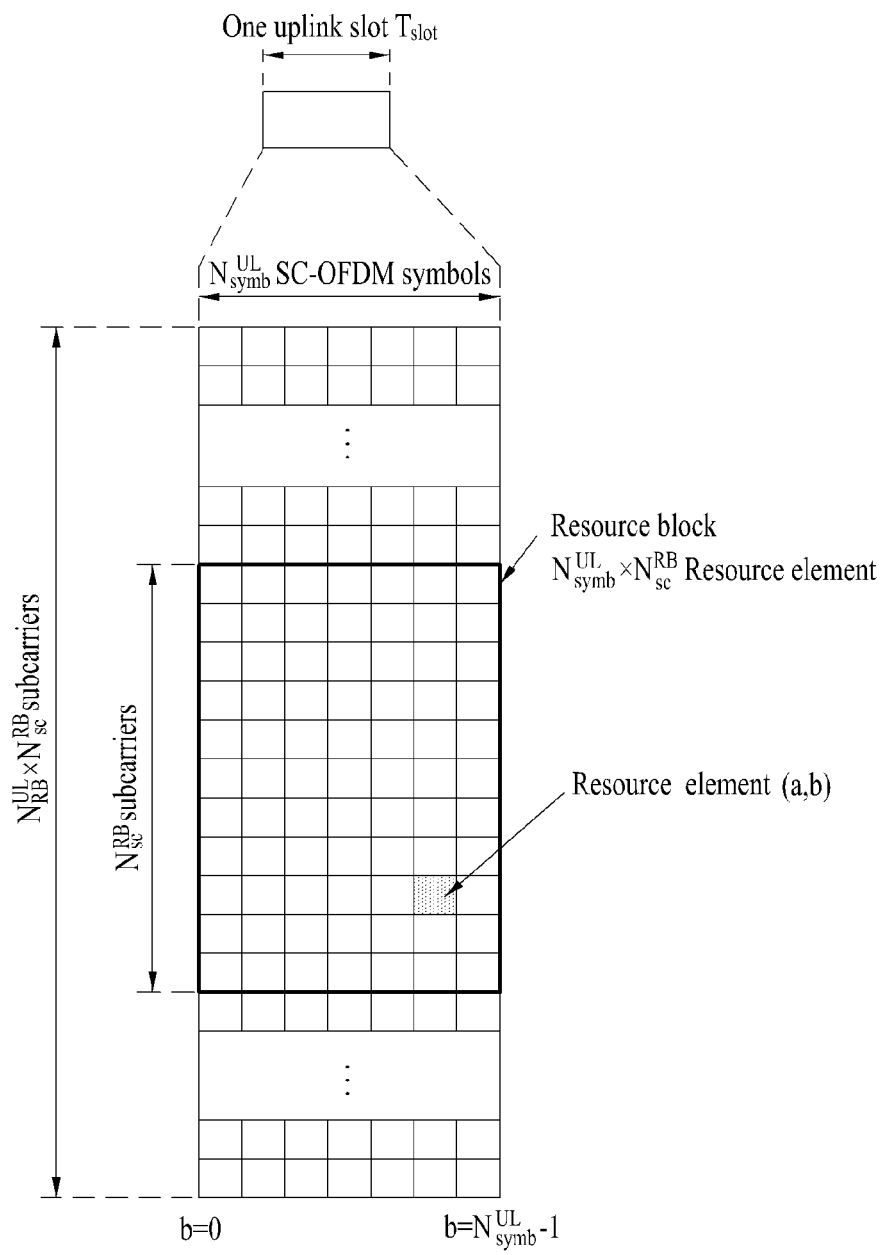
FIG. 4 shows the structure of a LTE uplink slot.
Figure 5:
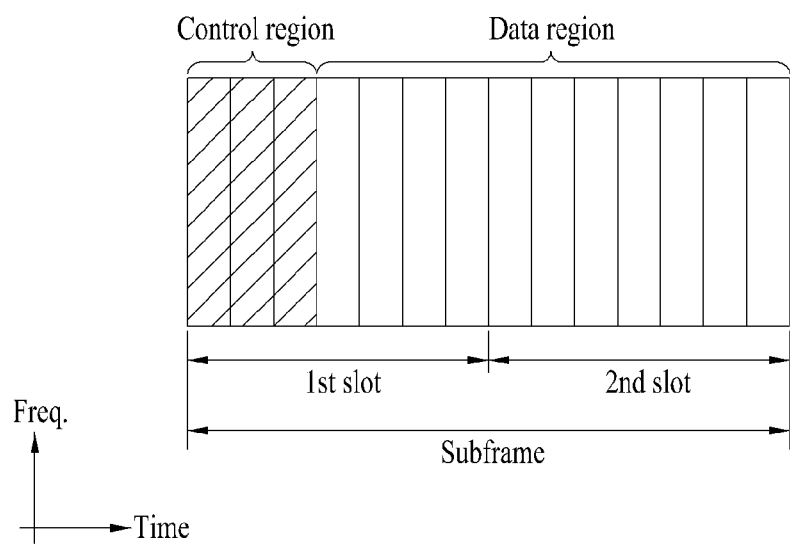
FIG. 5 shows the structure of a downlink subframe.
Figure 6:
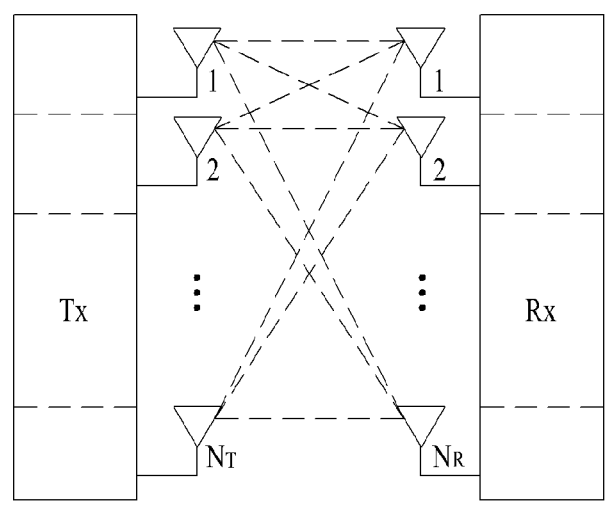
FIG. 6 shows a configuration of a conventional MIMO communication system.
Figure 7:
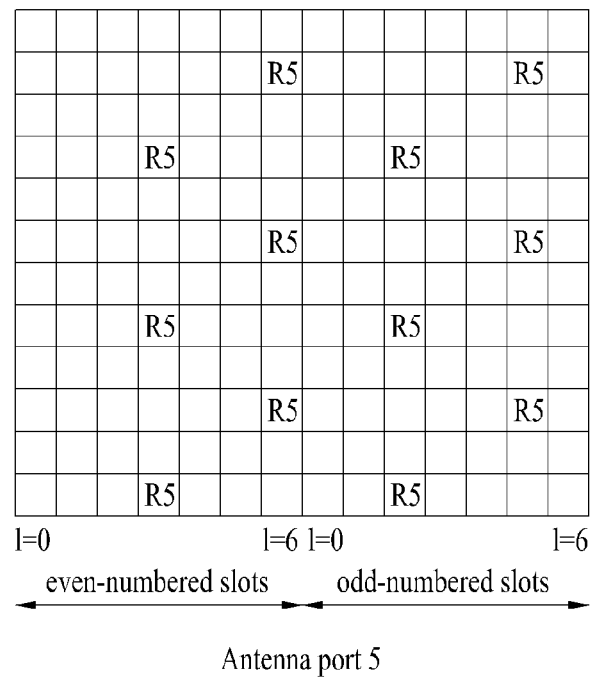
FIG. 7 shows the structure of a UE (User Equipment)-specific reference signal in a subframe using a normal CP (Cyclic Prefix), in which one TTI (Transmission Time Interval) has 14 OFDM symbols.
Figure 8:
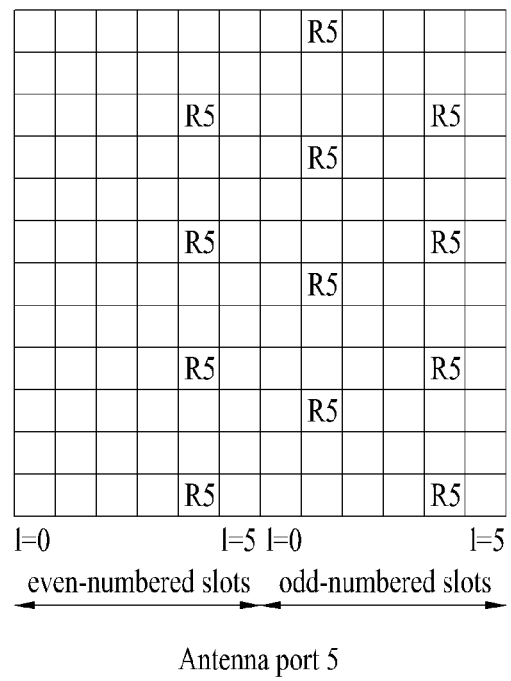
FIG. 8 shows the structure of a UE-specific reference signal in a subframe using an extended CP, in which one TTI has 12 OFDM symbols.
Figure 9:
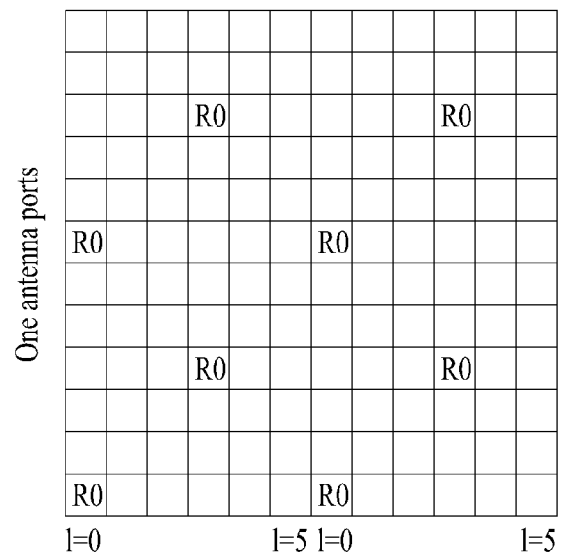
FIGS. 9, 10 and 11 show structures of UE-common downlink reference signals for systems respectively having one, two and four transmit antennas when one TTI has 14 OFDM symbols.
Figure 10:
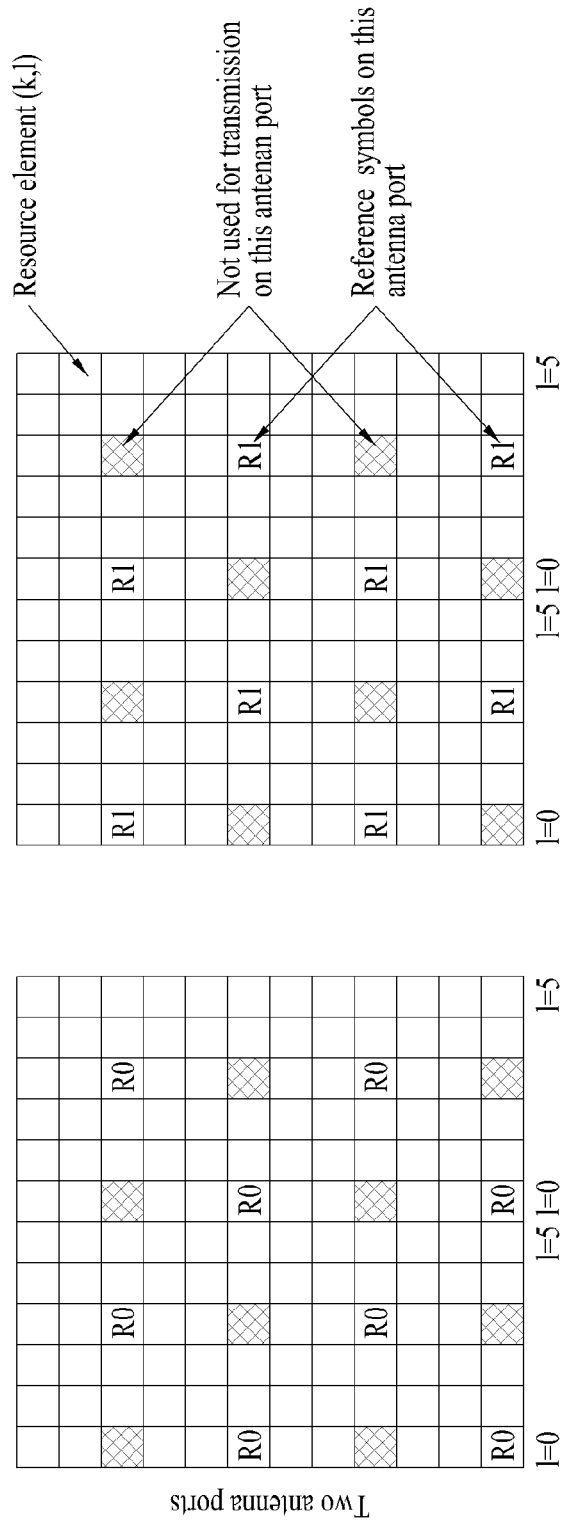
Figure 11:
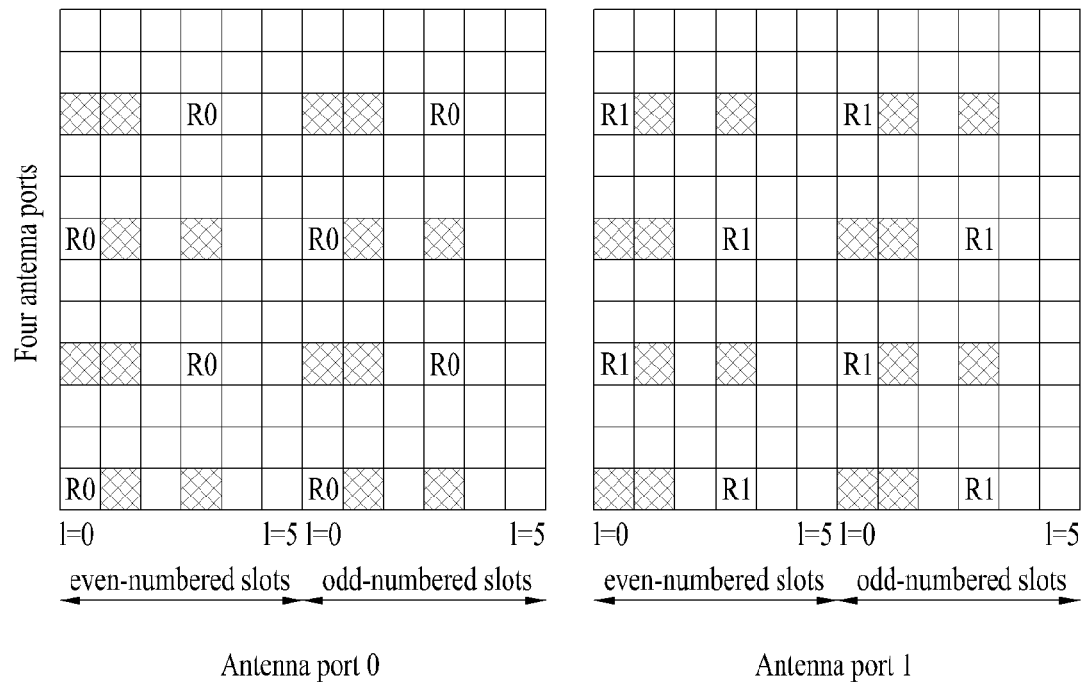
Figure 12:
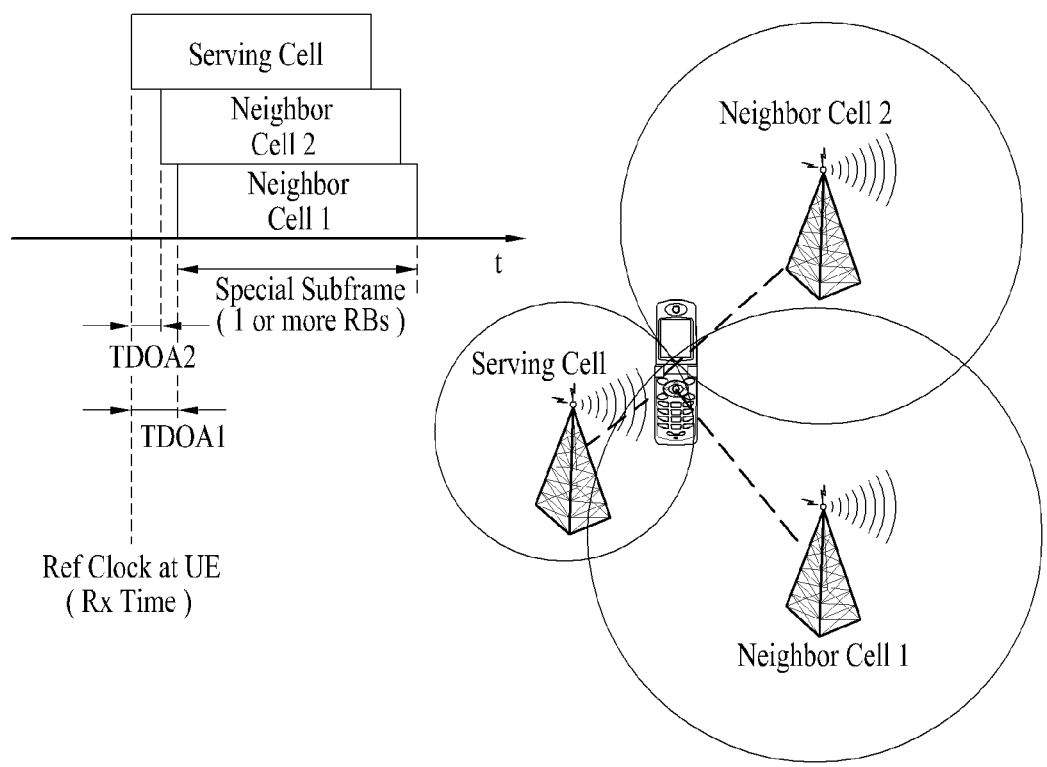
FIG. 12 shows an example of downlink OTDOA that is a kind of a terrestrial positioning based method used in 3GPP standard.
Figure 13:
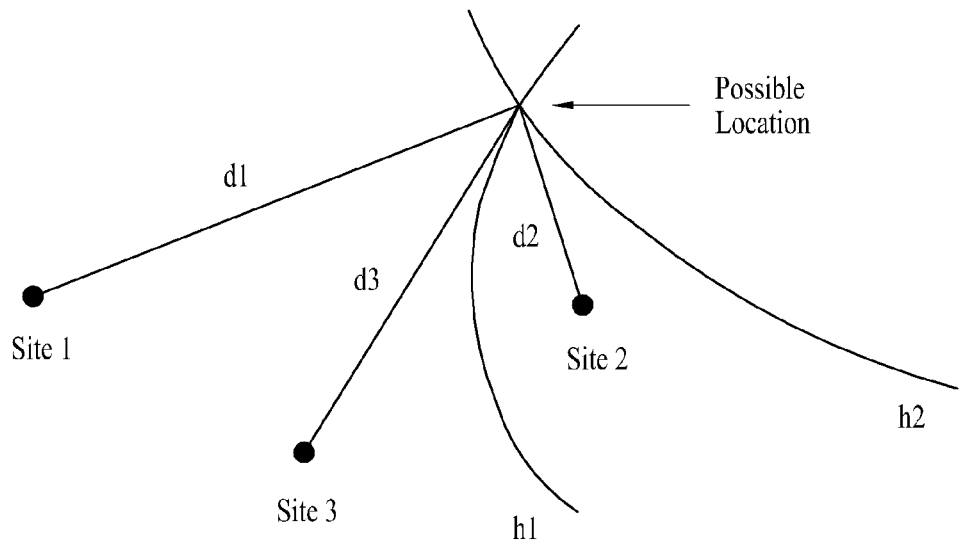
FIG. 13 shows an example of a user equipment positioning method using OTDOA.
Figure 14:
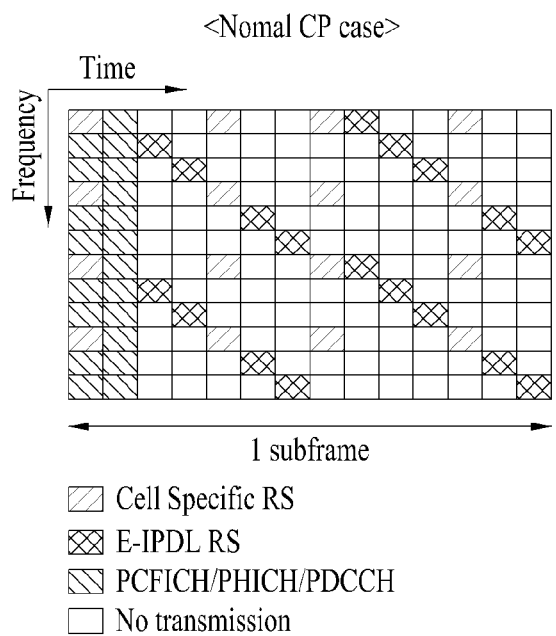
FIGS. 14 and 15 show structures of subframes including LCS RSs for OTDOA.
Figure 15:
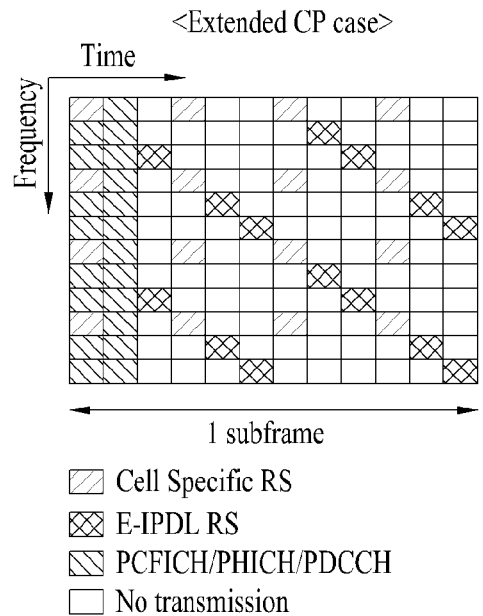
Figure 16:
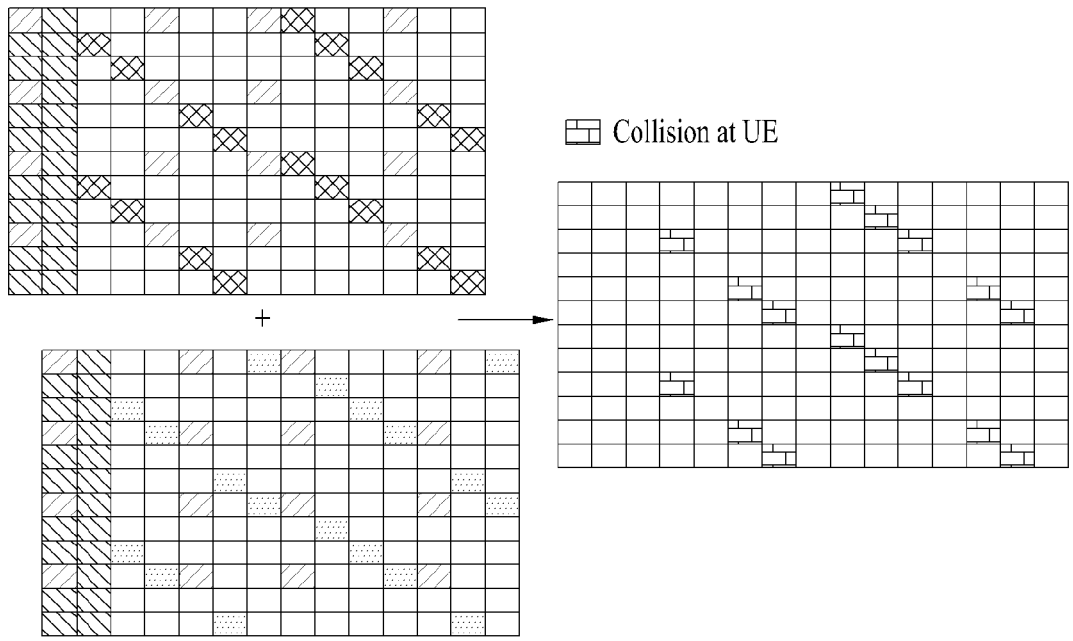
FIG. 16 illustrates a state that LCS RSs are received without being synchronized from multiple cells.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. In some instances, known structures and devices are omitted, or are shown in block diagram form focusing on important features of the structures and devices, so as not to obscure the concept of the present invention. The same reference numbers will be used throughout this specification to refer to the same or like parts.

Throughout the specification, when a certain part "includes" a certain element, it means that the part can further include other elements not excluding the other elements. Furthermore, the terms "unit" and "part" mean units which process at least one function or operation, which can be implemented by hardware, software, or combination of hardware and software.

The present invention proposes a method of extending a mother matrix representing mapping of reference signals (RSs) for user equipment position determination such that the RSs are transmitted within a predetermined section (for example, a subframe or one resource block) based on the mother matrix or mapping the RSs within the predetermined section based on the mother matrix.

In particular, the present invention proposes the following RS patterns.

(1) A pattern extended by changing the order of at least two columns or rows of a mother matrix (2) A pattern obtained by puncturing at least one column or row of a mother matrix This pattern includes a pattern extended by changing the order of at least two columns or rows of a mother matrix.

(3) A pattern extended by repeating at least one column or row of a mother matrix This pattern includes a pattern extended by changing the order of at least two columns or rows of a mother matrix.

(4) A pattern arranged such that frequency reuse of coexisting different types of RSs (for example, CRS or DRS (Dedicated Reference Signal)) corresponds to at least one column or row of a mother matrix in consideration of the existing RS or the coexisting different types of RSs In this pattern, the remaining columns and rows may be mapped in a circular shift form.

(5) A pattern in which at least one column of a mother matrix is repeated around a coexisting different type of RS (for example, CRS or DRS) in consideration of the existing RS or the coexisting different type of RS The present invention supposes 1) a mother matrix based on a Costas array and 2) a mother matrix based on cell ID/symbol modular. However, the present invention is not limited to these mother matrices and can be based on various mother matrices.

The mother matrix based on a Costas array and the mother matrix based on cell ID/symbol modular will now be explained.

1) Costas array based mother matrix

A Costas array named after John P. Costas can be regarded geometrically as a set of n points lying on the squares of an n×n checkerboard, such that each row or column contains only one point, and that all of the n(n−1)/2 displacement matrices between each pair of dots are distinct. This results in an ideal 'thumbtack auto-ambiguity function', making the array useful in applications such as sonar and radar.

A Costas array may be represented numerically as an n×n array of numbers, where each entry is either 1, for a point, or 0, for the absence of a point. When interpreted as binary matrices, these arrays of numbers have the property that, since each row and column has the constraint that it only has one point on it, they are therefore also permutation matrices. Thus, the Costas arrays for any given n are a subset of the permutation matrices of order n.

A Welch-Costas array, or Welch array is generated using the following method. The Welch-Costas array is constructed by taking a primitive root g of a prime number p and defining the array A by $A_{i,j}=1$, otherwise 0. The result is a Costas array of size p−1.

For example, 3 is a primitive root of 5. Here, a Costas permutation can be obtained using the following modulo operations.

$3^1 = 3$ $3^2 = 9 = 4 \pmod 5$ $3^3 = 27 = 2 \pmod 5$ $3^4 = 81 = 1 \pmod 5$

Therefore, [3,4,2,1] is a Costas permutation. More specifically, this is an exponential Welch array. The transposition of the array is a logarithmic Welch array.

Figures 17, 18, 19, 20:
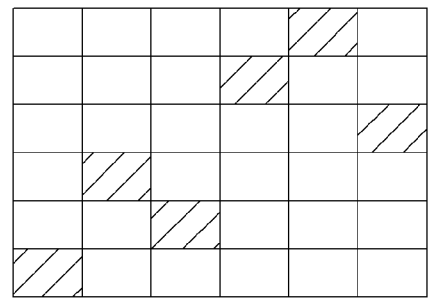
FIG. 17 shows a matrix pattern according to reuse planning using a Costas array when N=6.
FIG. 18 shows a result of allocation of cell IDs to the Costas array pattern shown in FIG. 17.
FIGS. 19 and 20 show exemplary results of circular shifting and permutation of the Costas array pattern shown in FIG. 18.

FIG. 17 shows a matrix pattern according to reuse planning using a Costas array when N=6. That is, FIG. 17 shows a 6×6 Costas array pattern. FIG. 18 shows a result of allocation of cell IDs to the Costas array pattern of FIG. 17. A specific column of the Costas array shown in FIG. 18 can be circular-shifted or permutated. FIGS. 19 and 20 show exemplary results of circular shift or permutation of the Costas array shown in FIG. 18.

Figures 21, 22:
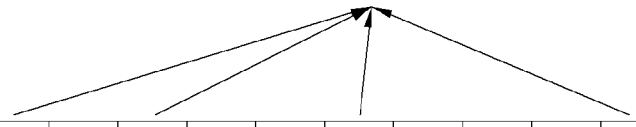
FIG. 21 shows a result of allocation of cell IDs to a matrix according to reuse planning using a Costas array when N=10.
FIG. 22 shows punctured columns in a cell ID/symbol modular based mother matrix with N=12 in a normal cyclic prefix (CP) case.

The matrix pattern can be extended to a matrix with N=10 using the above-mentioned method. FIG. 21 shows a result of allocation of cell IDs to a matrix according to reuse planning using a Costas array when N=10.

The cell ID/symbol modular based mother matrix will now be explained.

2) Cell ID/symbol modular based mother matrix

The cell ID/symbol modular based mother matrix can be generated using the following Equation 4.

$k_n^m = \mod(\mod(a^m \cdot (n+1), N_p) - 1 + n_{subblock}, N)$ $n = 0, 1, \ldots, N_{sym}-1$ $n_{subblock} = 0, 1, \ldots, N_{subblock}-1$ [Equation 5]

In Equation 5, $N_{sym}$ may be the number of OFDM symbols in one subframe, and $n_{subblock}$ may be the number of N×N matrices in a specific range. Here, if subblocks are generated based on subframes, $n_{subblock}$ may be a subframe index $n_{SF}$. Though $n_{SF}$ can have the same value for all subframes, it is assumed that $n_{SF}$ has different values for subframes in the present invention. $N_p$ may be the smallest prime number among integers larger than N.

Furthermore, $a^m$ may be a function of cell IDs.

Here, the cell IDs may be reused cell IDs. For example, if the number of cell IDs is 504, cell IDs used in the present invention can be represented as m=mod(n_cellid, N) when reuse of N cell IDs is applied.

Here, $n_{subblock}$ designates a hopping pattern depending on a specific unit and can be defined in connection with cell IDs as well as $n_{SF}$. For example, $n_{subblock}$ can be designated as $n_{subblock} = n_{SF} + $ cell ID such that a RS pattern can be hopped in connection with cell IDs for each subframe.

An example of a matrix with N=6 is represented as follows.

| 0 | 3 | 4 | 1 | 2 | 5 |
|---|---|---|---|---|---|
| 1 | 0 | 2 | 3 | 5 | 4 |
| 2 | 4 | 0 | 5 | 1 | 3 |
| 3 | 1 | 5 | 0 | 4 | 2 |
| 4 | 5 | 3 | 2 | 0 | 1 |
| 5 | 2 | 1 | 4 | 3 | 0 |

[Expression 6]

An example of a matrix with N=10 is represented as follows.

$$\begin{bmatrix} 0 & 5 & 3 & 2 & 8 & 1 & 7 & 6 & 4 & 9 \\ 1 & 0 & 7 & 5 & 6 & 3 & 4 & 2 & 9 & 8 \\ 2 & 6 & 0 & 8 & 4 & 5 & 1 & 9 & 3 & 7 \\ 3 & 1 & 4 & 0 & 2 & 7 & 9 & 5 & 8 & 6 \\ 4 & 7 & 8 & 3 & 0 & 9 & 6 & 1 & 2 & 5 \\ 5 & 2 & 1 & 6 & 9 & 0 & 3 & 8 & 7 & 4 \\ 6 & 8 & 5 & 9 & 7 & 2 & 0 & 4 & 1 & 3 \\ 7 & 3 & 9 & 1 & 5 & 4 & 8 & 0 & 6 & 2 \\ 8 & 9 & 2 & 4 & 3 & 6 & 5 & 7 & 0 & 1 \\ 9 & 4 & 6 & 7 & 1 & 8 & 2 & 3 & 5 & 0 \end{bmatrix}$$ [Expression 7]

An example of a matrix with N=12 is represented as follows.

$$\begin{bmatrix} 0 & 6 & 8 & 9 & 7 & 10 & 1 & 4 & 2 & 3 & 5 & 11 \\ 1 & 0 & 4 & 6 & 2 & 8 & 3 & 9 & 5 & 7 & 11 & 10 \\ 2 & 7 & 0 & 3 & 10 & 6 & 5 & 1 & 8 & 11 & 4 & 9 \\ 3 & 1 & 9 & 0 & 5 & 4 & 7 & 6 & 11 & 2 & 10 & 8 \\ 4 & 8 & 5 & 10 & 0 & 2 & 9 & 11 & 1 & 6 & 3 & 7 \\ 5 & 2 & 1 & 7 & 8 & 0 & 11 & 3 & 4 & 10 & 9 & 6 \\ 6 & 9 & 10 & 4 & 3 & 11 & 0 & 8 & 7 & 1 & 2 & 5 \\ 7 & 3 & 6 & 1 & 11 & 9 & 2 & 0 & 10 & 5 & 8 & 4 \\ 8 & 10 & 2 & 11 & 6 & 7 & 4 & 5 & 0 & 9 & 1 & 3 \\ 9 & 4 & 11 & 8 & 1 & 5 & 6 & 10 & 3 & 0 & 7 & 2 \\ 10 & 11 & 7 & 5 & 9 & 3 & 8 & 2 & 6 & 4 & 0 & 1 \\ 11 & 5 & 3 & 2 & 4 & 1 & 10 & 7 & 9 & 8 & 6 & 0, \end{bmatrix}$$ [Expression 8]

As described above in 1) Costas array based mother matrix, a mother matrix can be generated by circularly shifting or permuting the above matrices.

Generation of the above-mentioned RS pattern will now be explained in detail based on the aforementioned mother matrices.

(1) The pattern extended by changing the order of at least two columns or rows of a mother matrix corresponds to the above-described pattern in which the order of columns or rows is changed through circular shift or permutation. Here, although it was assumed that the control channel region corresponds to three OFDM symbols, the control channel region is not limited thereto.

(2) The Pattern Obtained by Puncturing at Least One Column or Row of a Mother Matrix If a RS pattern is designed based on one resource block and one subframe, the size of a generated mother matrix may be based on a larger one of a time resource and a frequency resource. For example, one RB is composed of 12 subcarriers, one subframe includes 8 OFDM symbols in a normal CP case and 6 OFDM symbols in an extended CP case except a control region and CRS. Accordingly, a mother matrix having N=12 can be designed. In this case, gain according to reuse can be maximized.

Alternatively, the size of a generated mother matrix may be based on a smaller one of the time resource and frequency resource. For example, one RB is composed of 12 subcarriers, one subframe includes 8 OFDM symbols in a normal CP case and 6 OFDM symbols in an extended CP case. Accordingly, a mother matrix having N=6 can be designed. In this case, it is possible to eliminate ambiguity due to multiple peaks in timing synchronization since one subframe has no null subcarrier.

Mother matrices based on a Costas array and cell ID/symbol modular will now be explained. However, if required, only one of the Costas array based mother matrix and cell ID/symbol modular based mother matrix is described for facilitation of explanation.

A method of using a mother matrix generated based on N=12 is explained first.

Figure 23:
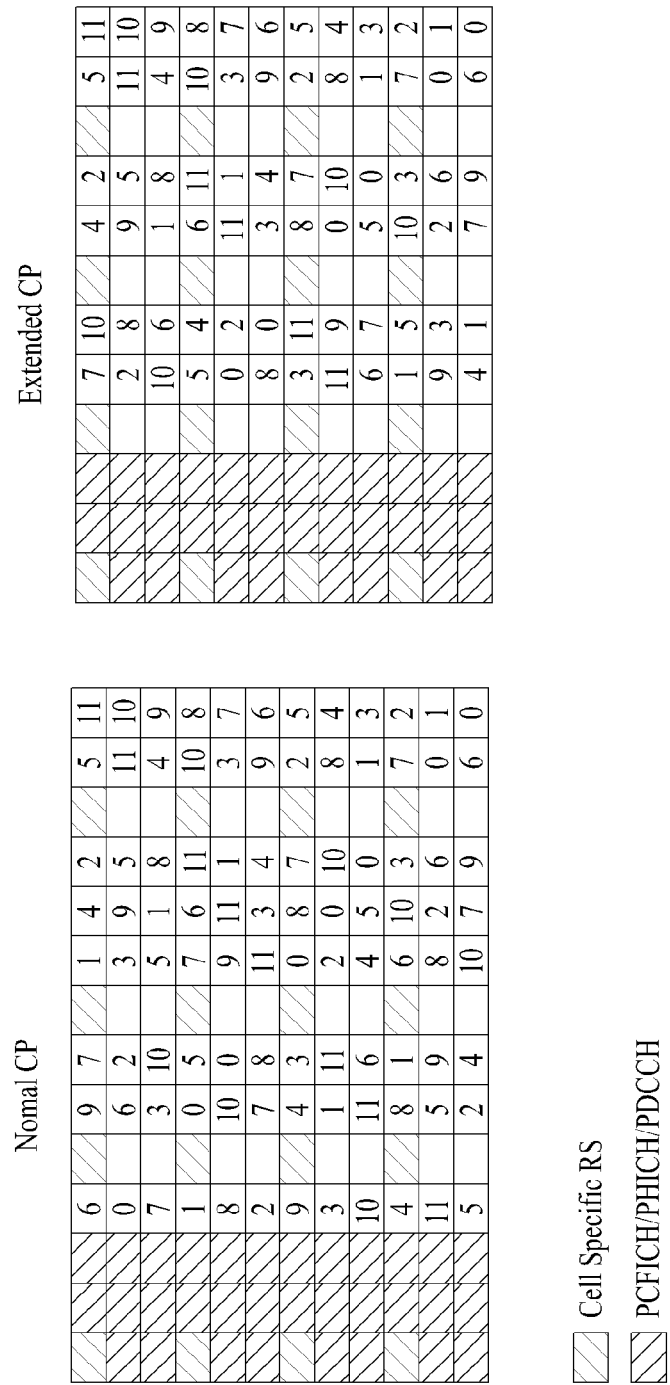
FIG. 23 shows a case in which a cell ID/symbol modular based mother matrix with N=12 is applied to subframes.

FIG. 22 shows punctured columns in a cell ID/symbol modular based mother matrix generated based on N=12 in a normal CP case. FIG. 23 shows cases in which the cell ID/symbol modular based mother matrix generated based on N=12 is applied to subframes. In FIG. 23, the left part corresponds to a normal CP case and the right part corresponds to an extended CP case. In FIG. 23, $0^{th}$, second, fifth and ninth columns are punctured in the normal CP case and $0^{th}$, first, second, third, sixth and ninth columns are punctured in the extended CP case. Here, the punctured columns correspond to regions where cell-specific RSs are located or regions where control channels are located.

The mother matrix is constructed such that the last column is mapped to the last OFDM symbol.

Figure 24:
FIG. 24 shows an example of applying a mother matrix with N=12 to MBSFN subframe.
Figure 24:

FIG. 24 shows an example of applying the mother matrix with N=12 to a MBSFN (Multimedia Broadcast Single Frequency Network) subframe. In FIG. 24, $0^{th}$ and first columns are punctured.

Furthermore, a mother matrix can be designed such that multiple peaks are not present in the time domain during puncturing in consideration of use of CRS or use of CRS with PRS.

Particularly, puncturing can be performed with circular shift in consideration of a reuse pattern of CRS. For example, a CRS reuse pattern is $[0,1,2,3,4,5,0,1,2,3,4,5]^T$ in the case of 1 Tx, which corresponds to the first column (column 0) in the above-described cell ID/symbol modular based mother matrix. Accordingly, it is possible to locate the first column on the CRS and puncture it. For example, in order to locate the first column of the mother matrix on the first CRS symbol ($n_{sym}=4$) among CRSs except a control channel region, the mother matrix is circular-shifted to the right by 2 and puncturing is performed at the corresponding CRS position.

FIG. 25 shows a result of cyclic shift of the matrix shown in FIG. 22 to the right by 2 in a normal CP case.

FIG. 26 shows a result of cyclic shift of the matrix shown in FIG. 22 to the right by 3 in an extended CP case.

Figure 27:
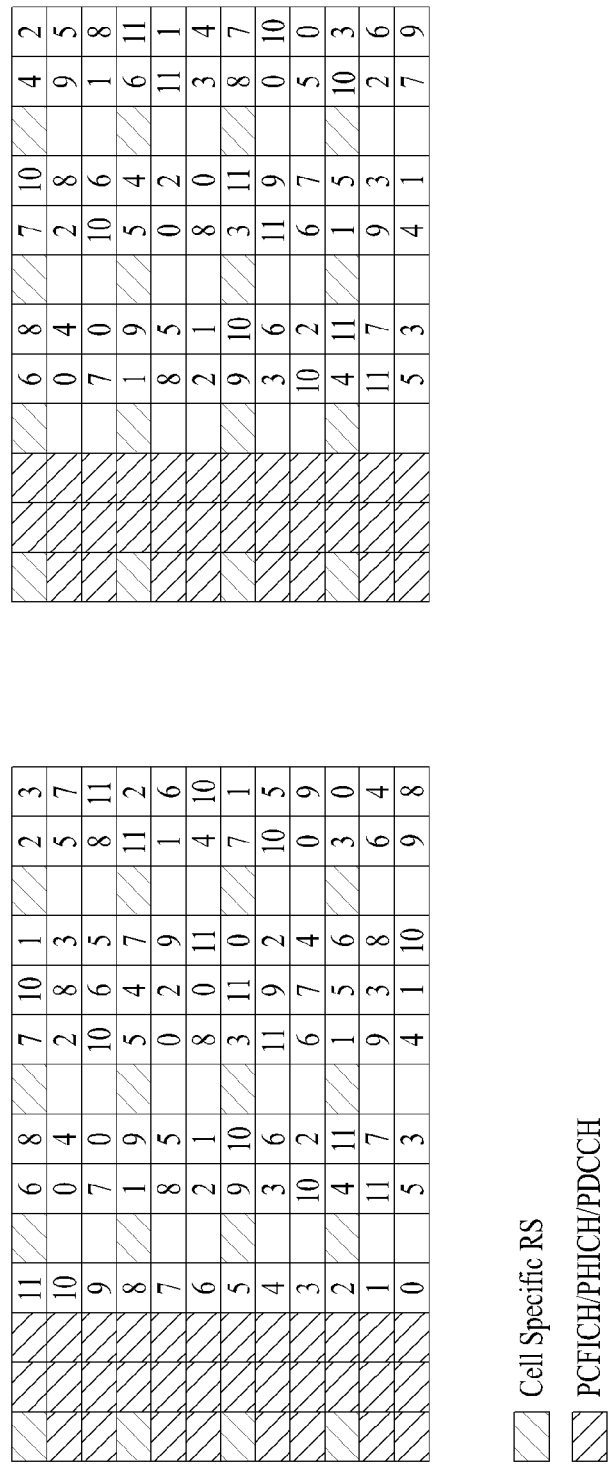
FIG. 27 shows a result obtained by applying the matrix shown in FIG. 25 and the matrix shown in FIG. 26 to subframes and performing puncturing.

FIG. 27 shows results obtained by applying the matrix of FIG. 25 and the matrix of FIG. 26 to subframes and performing puncturing. In FIG. 27, the left part corresponds to an extended CP case and the right part corresponds to an extended CP case.

Figure 28:
FIG. 28 shows a result obtained by applying the matrix shown in FIG. 25 to MBSFN subframe and performing puncturing.
Figure 28:

FIG. 28 shows a result obtained by applying the matrix of FIG. 25 to a MBSFN subframe and performing puncturing.

As shown in FIGS. 25 to 28, it is possible to perform cyclic shift on the mother matrix and apply the cyclic-shifted mother matrix to a subframe.

Figure 29:
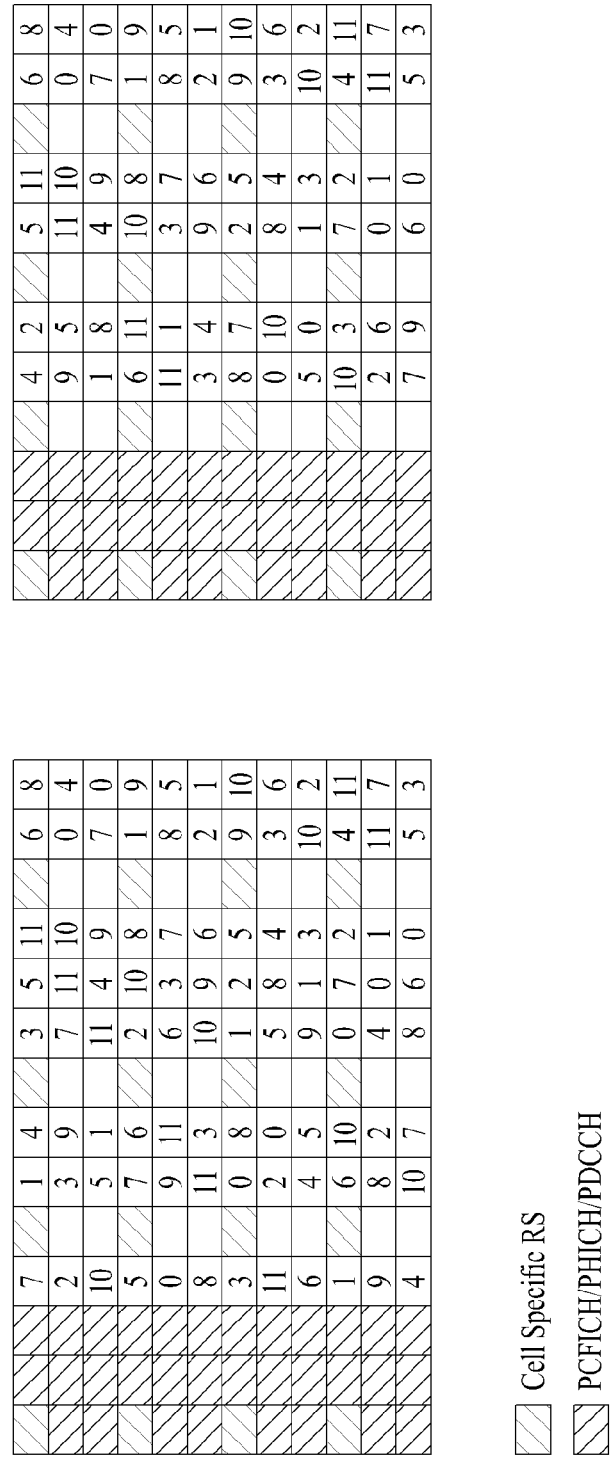
FIG. 29 shows an example of puncturing performed with the first column of a mother matrix with N=12 located on the last CRS symbol of a subframe in a normal CP case.

The first column (column 0) of $[0,1,2,]^T$ can be located on the last CRS symbol of the subframe and punctured. FIG. 29 shows an example of locating the first column of the mother matrix with N=12 on the last CRS symbol of a subframe and performing puncturing in a normal CP case. FIG. 30 shows an example of locating the first column of the mother matrix with N=12 on the last CRS symbol of a MBSFN subframe and performing puncturing.

A method of generating a mother matrix based on a Costas array will now be explained.

Figure 32:
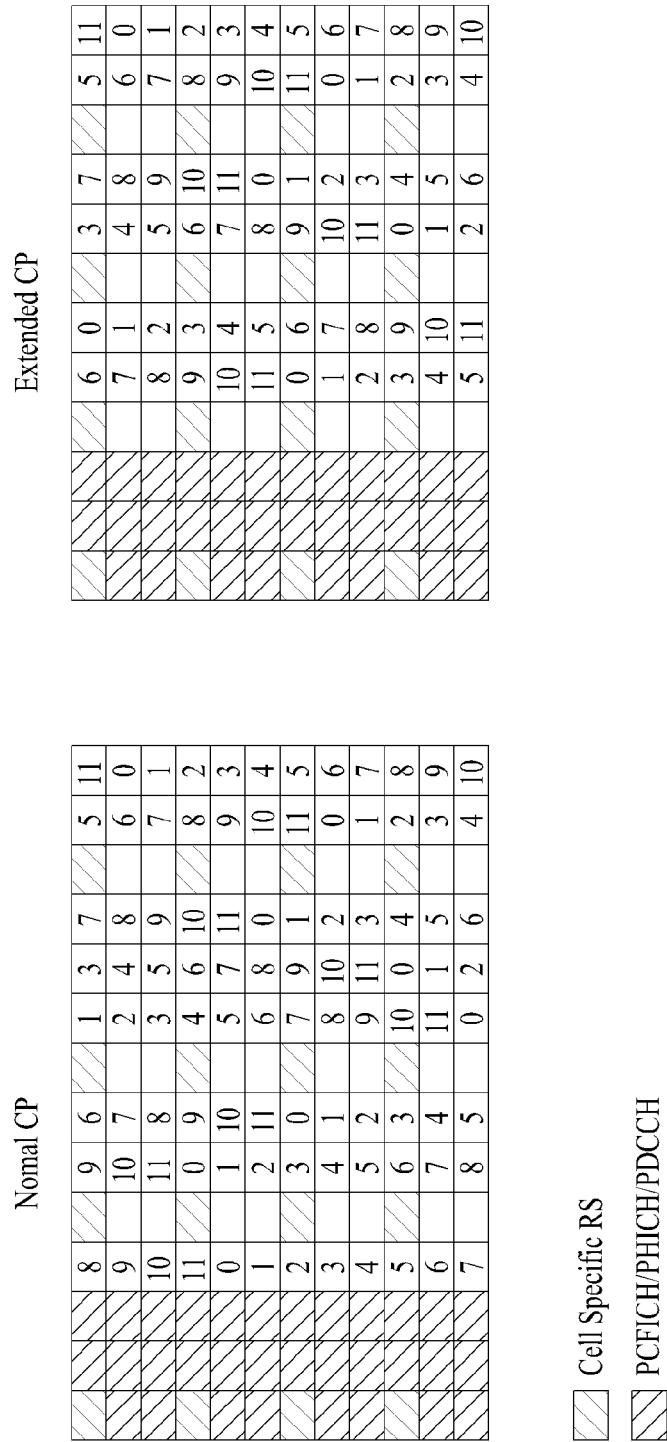
FIG. 32 shows cases in which the Costas array shown in FIG. 31 is applied to subframes.
Figures 33, 34:
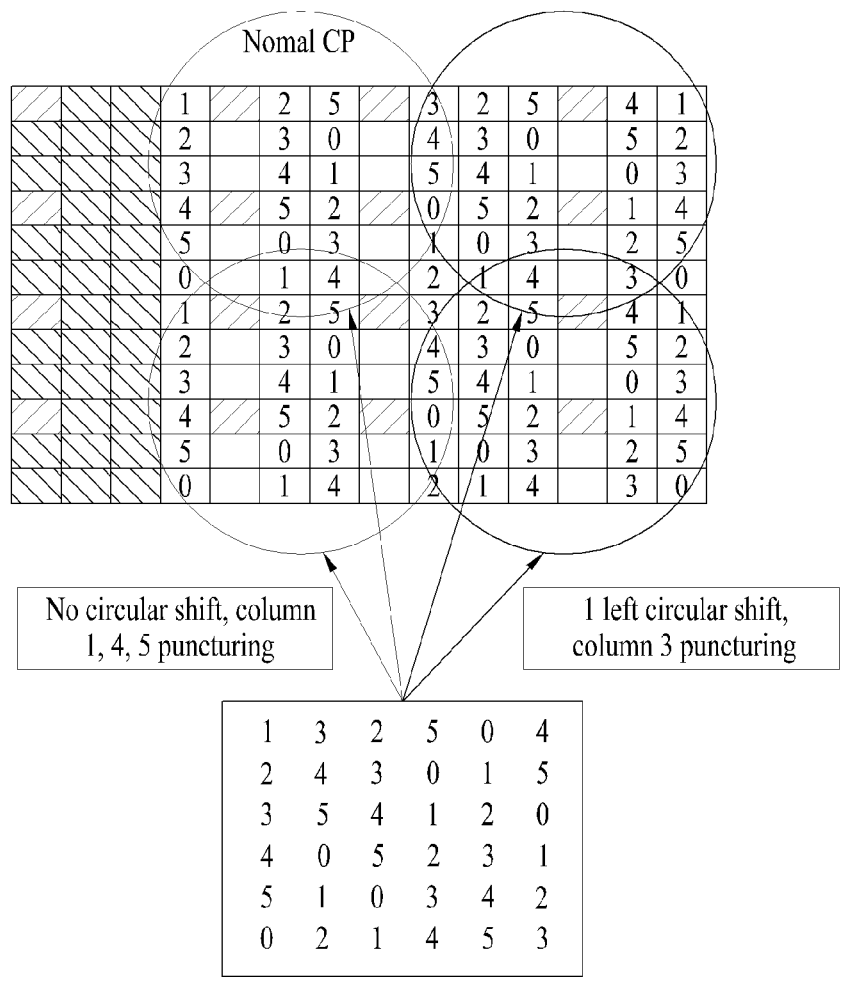
FIG. 33 shows a case in which the Costas array shown in FIG. 31 is applied to MBSFN subframe.
FIG. 34 shows an example of applying a Costas array based mother matrix with N=6 to a subframe and performing puncturing in a normal CP case.

FIG. 31 shows an exemplary Costas array having N=12. FIG. 32 shows a case in which the Costas array of FIG. 31 is applied to subframes. In FIG. 32, the left part shows a subframe corresponding to a normal CP case and the right part shows a subframe corresponding to an extended CP case. FIG. 33 shows a case in which the Costas array of FIG. 31 is applied to a MBSFN subframe.

Meantime, a mother matrix with N=12 can be generated by extending a mother matrix with N=6 and performing puncturing for the mother matrix with N=6. Here, the operation of generating the mother matrix having N=12 from the mother matrix having N=6 is similar to the above description except that the mother matrix having N=6 is extended such that it is suited to a subframe.

An extended matrix form is explained according to a Costas array based mother matrix generated based on N=6 (refer to FIGS. 17 and 18). Here, permutation can be performed in advance such that only columns corresponding to reused CRSs (0,1,2)(3,4,5,) are punctured. At this time, appropriate columns can be mapped.

The following Expression 9 represents an example of a Costas array based mother matrix.

$$\begin{matrix} 3 & 2 & 5 & 0 & 4 & 1 \\ 4 & 3 & 0 & 1 & 5 & 2 \\ 5 & 4 & 1 & 2 & 0 & 3 \\ 0 & 5 & 2 & 3 & 1 & 4 \\ 1 & 0 & 3 & 4 & 2 & 5 \\ 2 & 1 & 4 & 5 & 3 & 0 \end{matrix} \quad [\text{Expression 9}]$$

Figure 35:
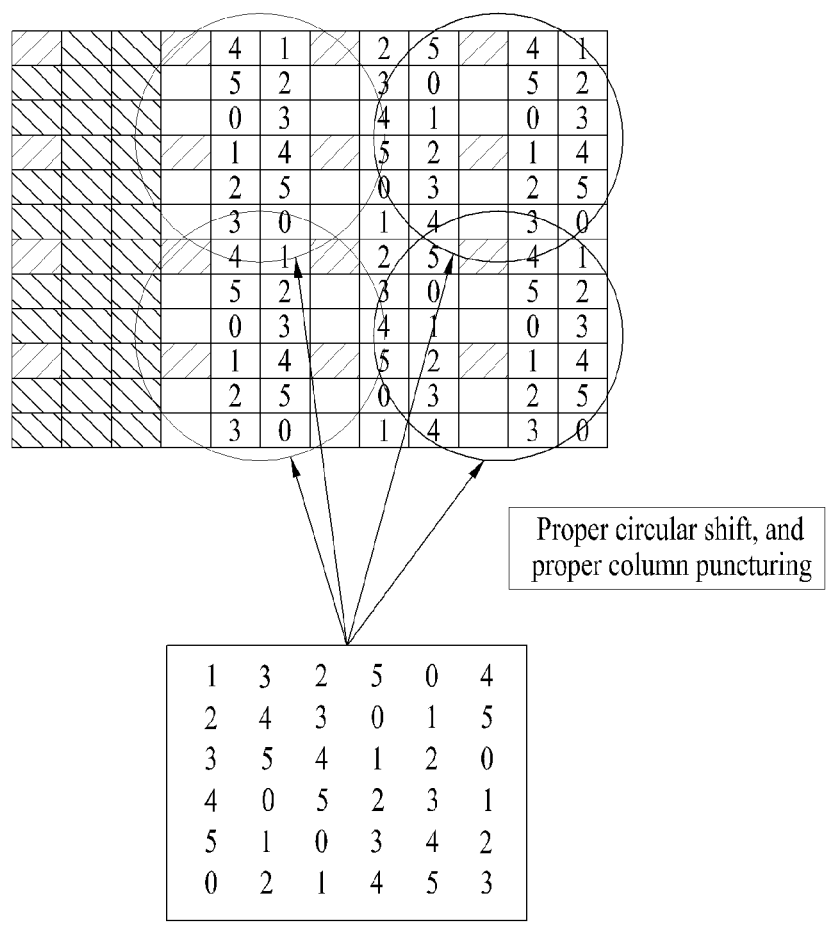
FIG. 35 shows an example of applying a Costas array based mother matrix with N=6 to a subframe and performing puncturing in an extended CP case.

The mother matrix of Expression 9 can be extended and applied to a subframe. FIG. 34 shows an example of applying a Costas array based mother matrix having N=6 to a subframe and performing puncturing in a normal CP case. FIG. 35 shows an example of applying a Costas array based mother matrix having N=6 to a subframe and performing puncturing in an extended CP case.

Figure 36:
FIG. 36 shows an example of applying a Costas array based mother matrix with N=6 according to an embodiment of the present invention to a subframe and performing puncturing.
Figure 36:

Meantime, it is possible to apply permutation of an appropriate column and row to the mother matrix of Expression 9. FIG. 36 shows an example of applying a Costas array based mother matrix having N=6 according to an embodiment of the present invention to a subframe and performing puncturing. In FIG. 36, the left part corresponds to a normal CP case and the right part corresponds to an extended CP case.

Figure 37:
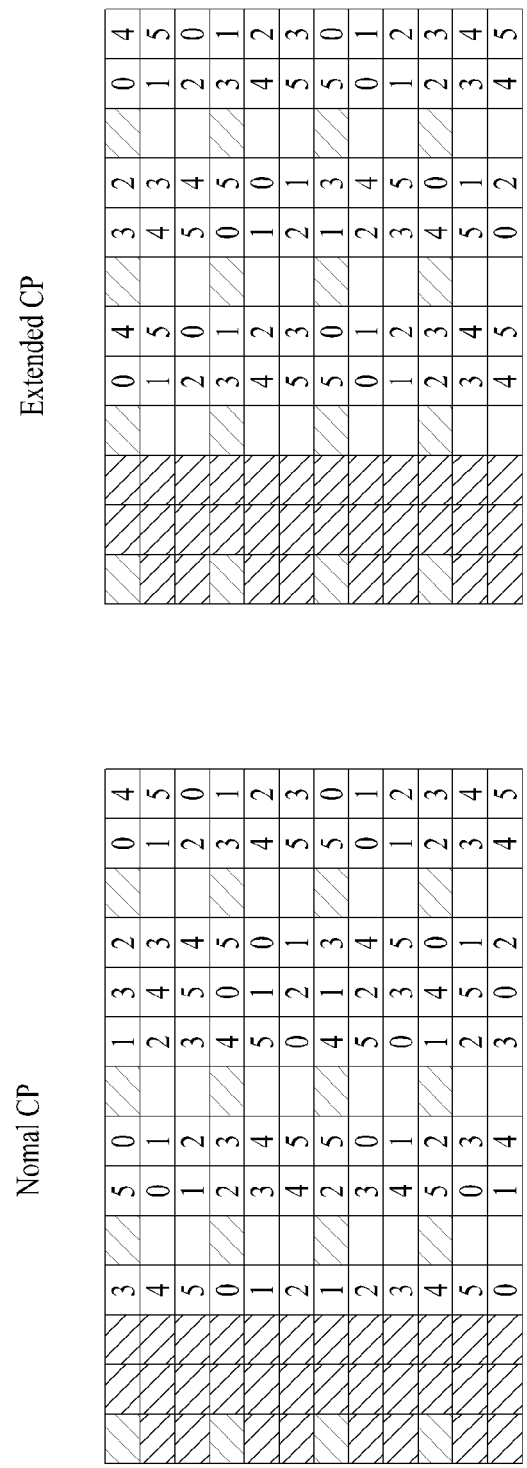
FIG. 37 shows an example of applying a Costas array based mother matrix with N=6 according to an embodiment of the present invention to a subframe and performing puncturing.

A mother matrix can be mapped onto a subframe such that cell IDs are evenly distributed in the overall frequency band when punctured. FIG. 37 shows an example of applying a Costas array based mother matrix having N=6 according to an embodiment of the present invention to a subframe and performing puncturing. In FIG. 37, the left part corresponds to a normal CP case and the right part corresponds to an extended CP case.

Figure 38:
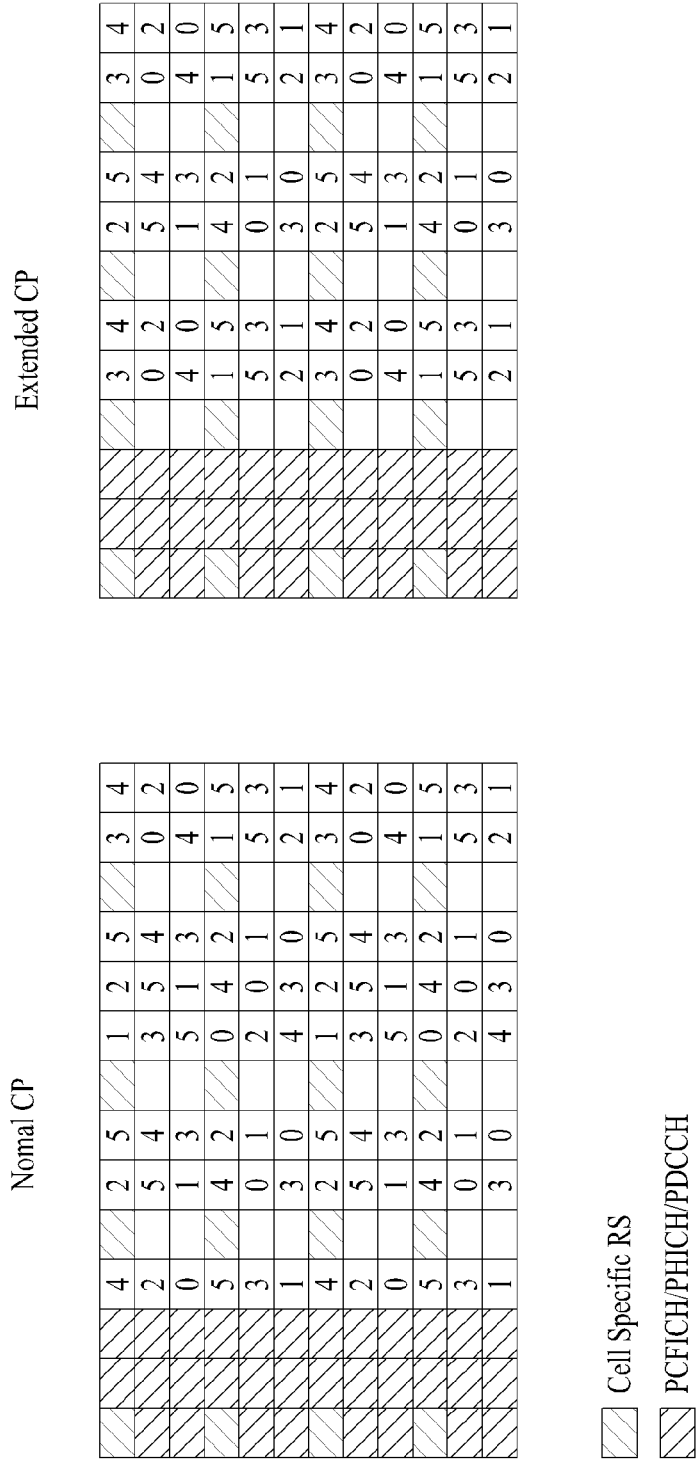
FIG. 38 shows an example of applying a cell ID/symbol modular based mother matrix with N=6 according to an embodiment of the present invention to a subframe and performing puncturing.

A cell ID/symbol modular based mother matrix can be applied to a subframe. FIG. 38 shows an example of applying a cell ID/symbol modular based mother matrix having N=6 according to an embodiment of the present invention to a subframe and performing puncturing. In FIG. 38, the left part corresponds to a normal CP case and the right part corresponds to an extended CP case.

(3) the Pattern Extended by Repeating at Least One Column or Row of a Mother Matrix This case includes a pattern extended by changing the order of at least two columns or rows of a mother matrix.

Figure 39:
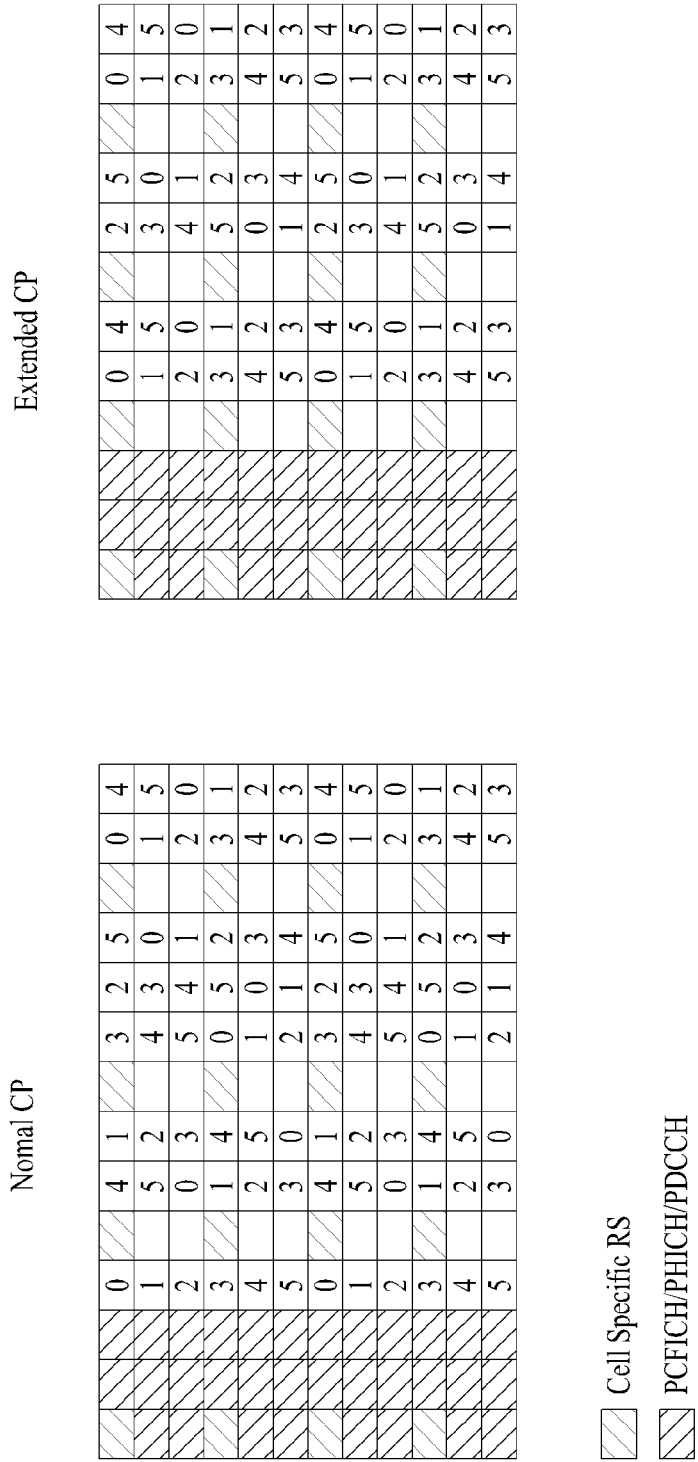
FIG. 39 shows patterns extended by repeating at least one column or row of a Costas array based mother matrix according to an embodiment of the present invention.
Figure 40:
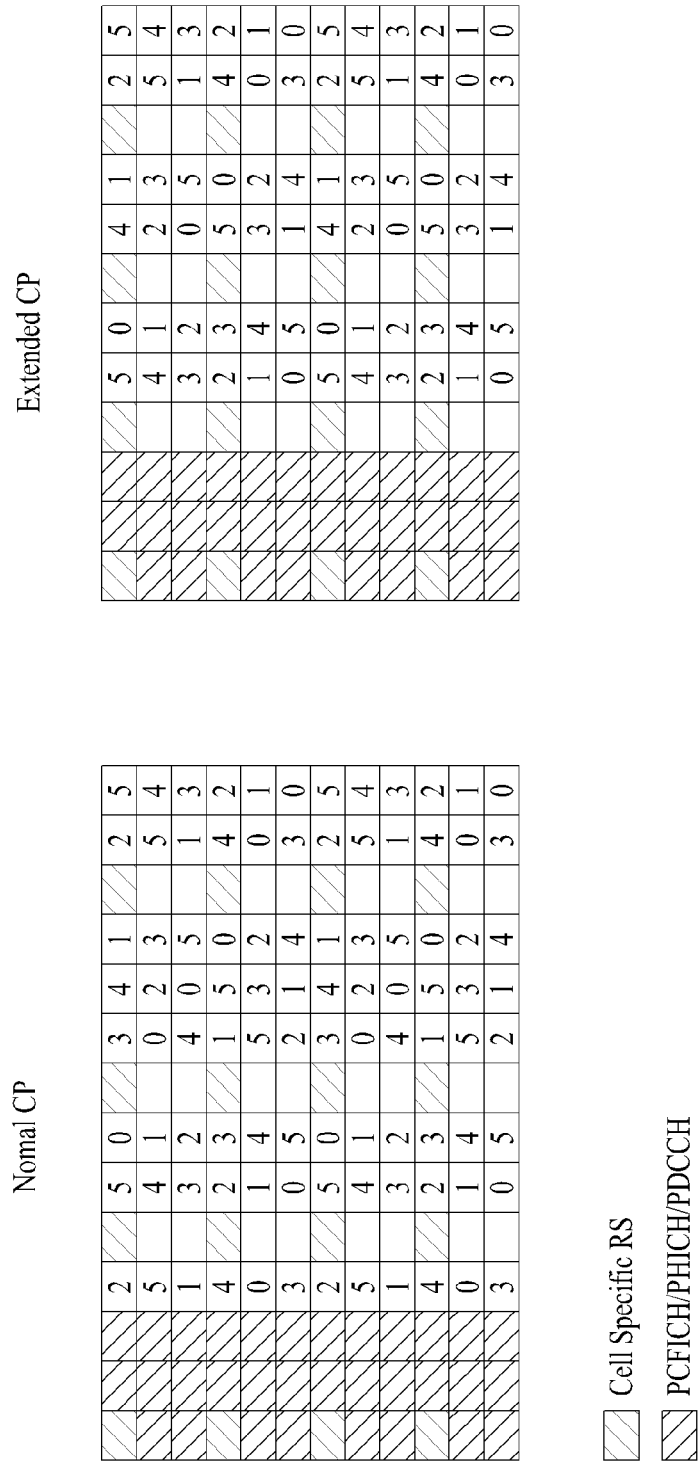
FIG. 40 shows patterns extended by repeating at least one column or row of a cell ID/symbol modular based mother matrix according to an embodiment of the present invention.

This method extends a mother matrix smaller than a given resource in consideration of elements for eliminating multiple peaks during interfering and synchronization with CRSs (a subframe needs to have no null subcarrier). Here, if left and right CRS symbols have columns of the same reuse pattern as CRS, interference between CRS and PA-RS can be solved. FIG. 39 shows a pattern extended by repeating at least one column or row of a Costas array based mother matrix according to an embodiment of the present invention. FIG. 40 shows a pattern extended by repeating at least one column or row of a cell ID/symbol modular based mother matrix according to an embodiment of the present invention.

(4) Mirroring Mapping

Figure 41:
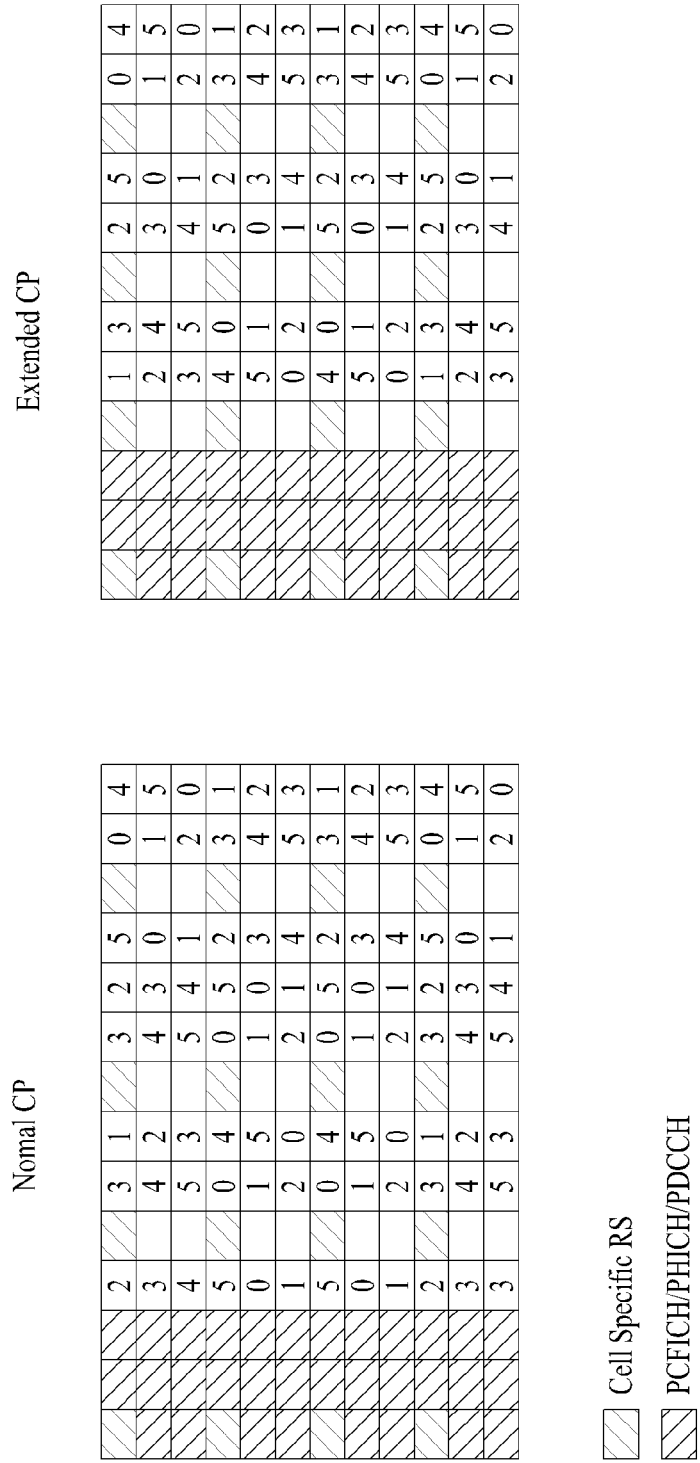
FIG. 41 shows results of mirroring mapping using a Costas array according to an embodiment of the present invention.

A mother matrix of N, which is smaller than a given resource, can be extended using a mirroring pattern. In other words, when a mother matrix of N is repeated, the mother matrix can be mapped such that elements of the mother matrix are mirrored at the repetition boundary to become symmetrical. While the same patterns are collided when a mother matrix is extended through simple repetition, extension through mirroring can randomize collision to other subcarriers. Furthermore, when a mother matrix is extended to the frequency domain, mapping can be performed in reverse order of the mapping order of the upper half of the mother matrix. FIG. 41 shows a result of mirroring mapping using a Costas array according to an embodiment of the present invention. In FIG. 41, the left subframe corresponds to a normal CP case and the right subframe corresponds to an extended CP case.

A PRS pattern for user equipment position estimation can be generated as follows. When frequency reuse is 6, PRS sequence $r_{l,n_s}(m)$ in a slot $n_s$ is mapped to a complex-valued modulation symbol $a_{k,l}^{(p)}$ for position measurement according to the following Equation 10.

$$\begin{aligned} k_l &= 6m + k'_l \\ k'_l &= (((v_{shift} + 1) \cdot (l' + 1)) \mod 7) - 1 \\ l' &= \begin{cases} (l-2) \mod 6, & \text{for normal } CP \\ l \mod 6, & \text{for extended } CP \end{cases} \\ m &= 0, 1, \ldots, 2 \cdot N_{RB}^{DL} - 1 \\ m' &= m + N_{RB}^{max,DL} - N_{RB}^{DL} \\ v_{shift} &= N_{ID}^{cell} \mod 6 \end{aligned} \quad [\text{Equation 10}]$$

In Equation 10, $N_{ID}^{cell}$ denotes PCI, $N_{RB}^{DL}$ denotes a downlink bandwidth, and $N_{RB}^{max, DL}$ denotes a maximum downlink bandwidth.

Figure 42:
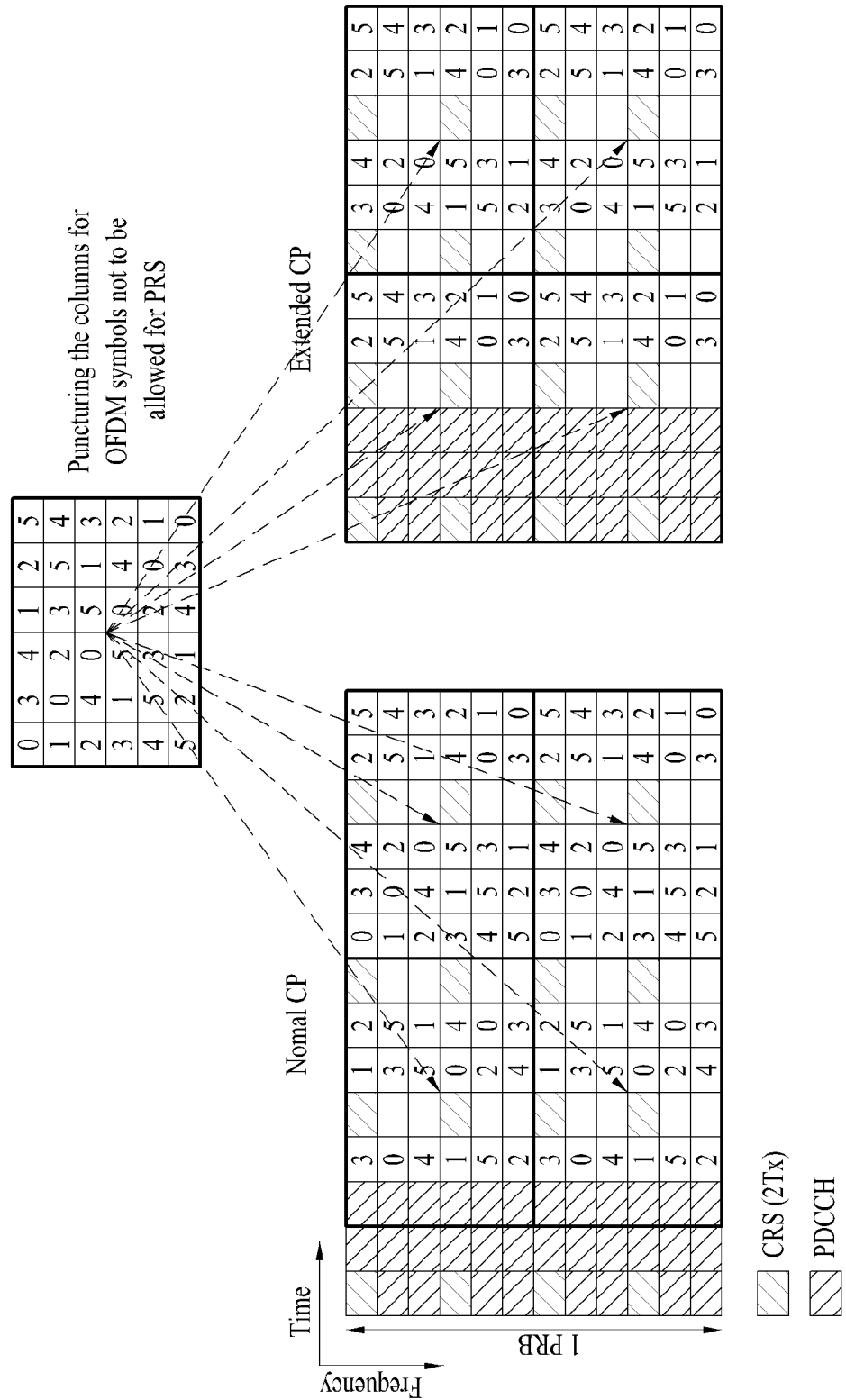
FIG. 42 shows a PRS pattern for frequency reuse 6 according to an embodiment of the present invention.

FIG. 42 shows a PRS pattern according to an embodiment of the present invention for frequency reuse 6.

Simulation of the performance of the PRS pattern will now be explained.

Basic simulation parameters are shown in the following Table 1. Even if CRS and PRS can be used together, only PRS is used for position determination in order to compare different suggestions in terms of pure PRS performance. Es/Iot and RSRP (Reference Signal Received Power) are measured at user equipment in order to measure hearibility for each cell. Here, Es represents energy of a desired signal, and It represents power spectral density of an interference signal and it may be referred to as SINR in general.

TABLE 1

| Parameter | Assumption |
| --- | --- |
| Cell layout | Hexagonal Grid, wrap around |
| Inter-site distance | 1732 m |
| Antenna gain | 15 dBi (3-sector antenna as defined in TR 36.942) |
| Distance-dependent pathloss | L = 128.1 + 37.6log$_{10}$(R)(R in km) |
| Carrier frequency | 2 GHz |
| Penetration loss and UE speed | Indoor: 20 dB, 3 km/h for 1732 m (case 3) |
| Carrier bandwidth | 1.4, 3, 5, 10, 20 MHz |
| eNB power | 46 dBm |
| UE noise figure | 9 dB |
| Lognormal shadowing standard deviation | 8 dB |
| Shadowing correlation Between sites | 0.5 |
| Shadowing correlation Between sectors | 1 |
| Correlation distance of shadowing | 50 m |
| Channel model | ETU |
| Network synchronization | Synchronous |
| Cyclic prefix | Normal CP |
| Positioning subframe | Normal subframe |
| Number of transmit antenna | 1 |
| CRS pattern | Rel-8 |
| PRS pattern | FIG. 42 unless otherwise mentioned |
| CRS transmission | Always ON |
| PRS boosting | Dependent on PRS pattern |
| Used RS for OTDOA measurement | PRS only |
| Number of receive antenna | 2 |
| Periodicity of positioning subframe | 320 ms |
| Number of accumulated consecutive subframes for positioning subframe | 1, 2, 4 |
| Number of PDCCH symbols | 3 |
| RS sequence | Pseudo-random QPSK |
| Probability of data blanking in positioning subframe | 100% |
| CRS/PRS transmission probability | 100% |
| Cell ID planning | Planned, Unplanned |
| Es/Iot threshold | −14 dB |
| RSRP threshold | −127 dBm |
| Max number of sites for OTDOA measurement | 10 |
| Timing measurement | Replica based, coherent combining within a subframe |
| Timing measurement window | Ideal timing assumption: around ideal timing (for comparison of different PRS patterns) Practical timing assumption: 10 km (for all cases) |

If a measurement result satisfies a threshold value, replica based timing measurement is performed in order to study accuracy of estimated timing for a sensed cell. Performance of position determination depends on hearibility and accuracy of estimated timing. The accuracy of timing depends on auto correlation or cross correlation of PRS pattern and sequence. The hearibility depends on time and frequency reuse. Two assumptions depending on a timing search window are considered in order to study the influence of auto correlation profile from different PRS patterns.

1) Ideal Timing Assumption

Timing measurement is performed around an ideal timing point corresponding to a shortest path. Auto correlation characteristic is hardly reflected in timing measurement because of PRS pattern. The performance of position determination mostly depends on hearibility.

2) Practical Timing Assumption

A timing search window covers up to 10 km. The performance of position determination is partially affected by auto correlation performance in timing accuracy. Accordingly, the performance of position determination will affect hearibility and timing accuracy for a PRS pattern.

According to the above description, an available number of PDCCH symbols is three when a system bandwidth is higher than 3 MHz and four when the system bandwidth is lower than 3 Mhz. In this case, two operations of user equipment are present in order to prevent position determination performance from being deteriorated. First, the user equipment always assumes a maximum number of PDCCH symbols. Second, a parameter about the number of PDCCH symbols is signaled to the user equipment. The first operation makes planning of a PRS pattern clear while the second operation requires additional overhead. For performance gain, the second si not distinct. According the first is advantageous for PRS pattern planning. Therefore, the present invention proposes planning of a PRS pattern on the assumption that the number of PDCCH symbols is three when $N_{RB}^{DL} > 10$ and four when $N_{RB}^{DL} \leq 10$.

However, as shown in FIG. 42, the number of PDCCH symbols is not varied with system bandwidth, and it is fixed to three all the time when PRS is transmitted. The PRS may be transmitted from the fourth OFDM symbol (when OFDM symbols in front on the time domain are numbered 0, 1, 2, . . . ) in case of normal CP. In case of extended CP, PRS may be punctured at the fourth OFDM symbol and transmitted from the fifth OFDM symbol since CRS is transmitted to the fourth OFDM symbol.

Meantime, it is possible to construct symbols for PDCCH such that a maximum number of the symbols is three and transmit PRS for the remaining symbols. Furthermore, PRS may be punctured for OFDM symbols transmitting CRS. The relationship between PCI and PRS-ID will now be explained.

Measurement of a current neighbor cell and report of the existing system (for example, Rel-8) are performed based on PCI. The number of PCIs is determined in consideration of effective cell ID planning Since cell planning for PRS-ID is required, PCI and PRS-ID need to have one-to-one relationship. The same format as the existing system can be reused for position report.

Recently, LCS (Location Service) has pointed out PCI collision and confusion in a heterogeneous network. The probability of PCI collision depends on the number of PCIs that can be used for a cell. Since the number of PCIs allocated to HeNB/CGS cell depends on deployment, the probability of collision may not be insignificant.

However, if 0 to 50 PCIs are stored at a system level for PCI collision, the probability of collision is not so high. Furthermore, the probability of collision can be further reduced according to a network based mechanism. Since downlink and uplink physical channels are transmitted based on PCI, PCI collision occurs again in other physical channels when PRS-ID is extended without PCI extension.

In conclusion, PRS-ID extension is not a fundamental solution as long as PCI range is not extended.

In associated with PCI confusion, user equipment may report global cell ID, for example.

In this view, it is necessary to make the seriousness of CPI collision clear. Furthermore, PRS-ID extension is not a good solution.

Figure 43:
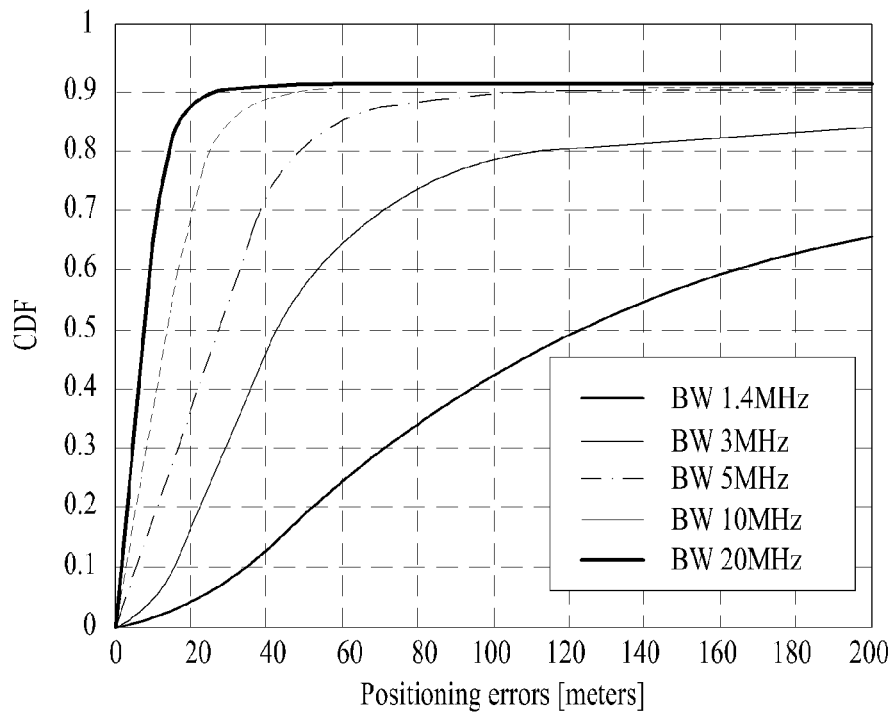
FIG. 43 shows position determination performance depending on system bandwidth.

The present invention proposes one-to-one relationship between PCI and PRS-ID. A wider bandwidth increases time resolution, and thus it improves the performance of position determination definitely. FIG. 43 shows the performance of position determination depending on system bandwidth. As shown in FIG. 43, it is valid that the system bandwidth is limited to 10 MHz.

The present invention proposes that a system bandwidth for a PRS pattern is limited to 10 Mhz (1.4 Mhz, 3 Mhz, 5 MHz, 10 Mhz).

A PRS pattern may be time-varying between different subframes. A time-varying PRS pattern and a non-time-varying PRS pattern have a trade-off relation. While the time-varying PRS pattern is expected to improve position determination performance, additional signaling for notifying a subframe number is required.

Figure 44:
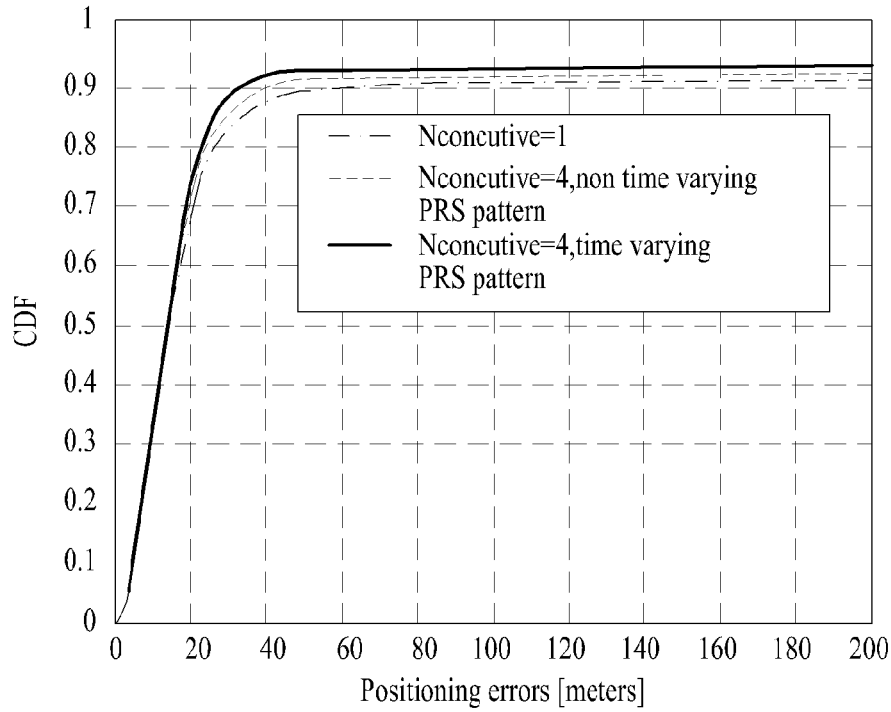
FIG. 44 shows position determination performance in a time-varying PRS pattern.

FIG. 44 shows position determination performance in a time-varying PRS pattern. It can be known that the performance of the mean of the time-varying PRS pattern is high on consecutive subframes, as compared to a non-time-varying PRS pattern. However, performance gain is not so high considering signaling overhead.

Moreover, a non-time-varying PRS pattern is desirable when trade-off between the performance and additional performance is considered.

Figure 45:
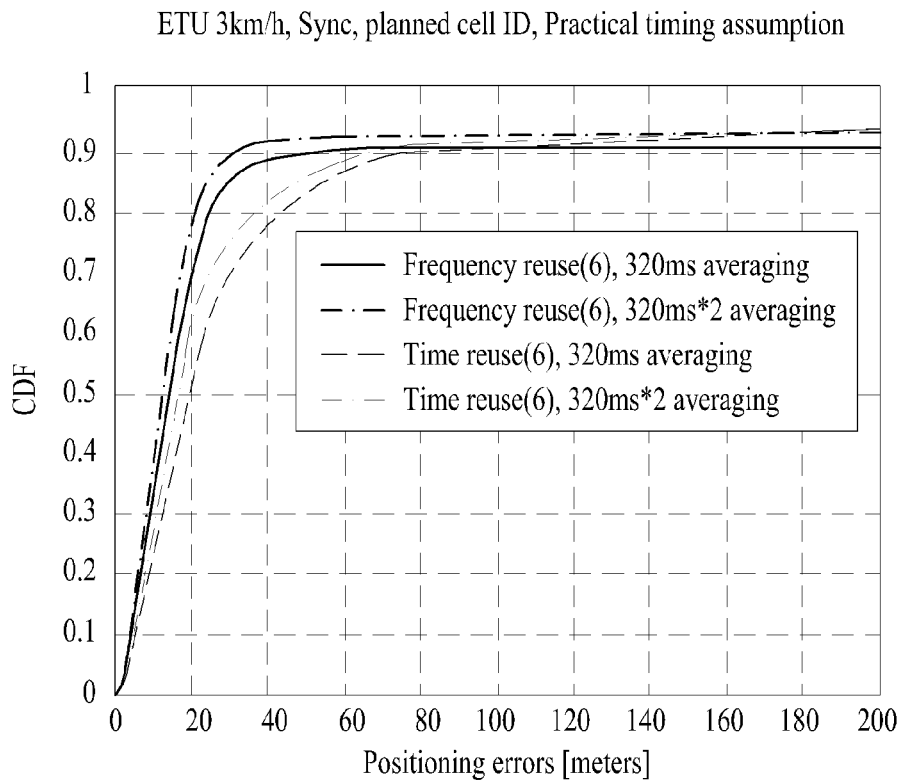
FIG. 45 shows position determination performance with respect to orthogonal frequency reuse 6 and orthogonal time reuse 6.

Frequency and time reuse access have a trade-off relationship. FIG. 45 shows position determination performance with respect to orthogonal frequency reuse 6 and orthogonal time reuse 6. It can be known that all subcarriers in an OFDM symbol are occupied in time reuse. Although the performance of time reuse is not higher than the performance of frequency reuse due to its low energy, convergence of position determination can be improved to a level similar to that of the frequency reuse according to accumulation of a plurality of subframes.

Therefore, orthogonal frequency reuse is more advantageous than orthogonal time reuse.

PRS patterns will now be compared.

First of all, two categories are explained.

(1) Orthogonal Reuse Basis

Different PRS patterns are generated according to orthogonal time or frequency shift. The number of patterns corresponds to time or frequency reuse. For example, six PRS patterns are present in case of reuse 6.

Complexity reduction scheme is available.

Multiple pits can be eliminated by removing null subcarriers in a subframe.

Proposers include company A, company B, company C, company D and company E.

(2) Fractional Reuse Basis

Different PRS patterns are generated according to quasi-orthogonal time and/or frequency shift.

The number of patterns corresponds to time and/or frequency reuse. For example, 96 (12×8) different PRS patterns are present in a normal CP case when three PDCCH symbols are assumed.

Complexity can be reduced by the different PRS patterns.

Fractional reuse can be performed by controlling the probability of PRS transmission from each cell.

Multiple pits or poor auto correlation profile is present because of null subcarrier in a subframe. This characteristic is very important in neighbor cell measurement performed at a very low SINR level.

Proposers include company F, company G, and company H.

Among the above proposals, position determination performance is investigated. Different modulation sequences are applied to different PRS patterns. For calculation, boosting of different RSs depending on the PRS patterns is considered. Here, a boosting level makes transmission energy even in one OFDM symbol.

Company A, company E: 6 dB
Company F, company G: 9 dB
Company B: 3 dB

Figure 46:
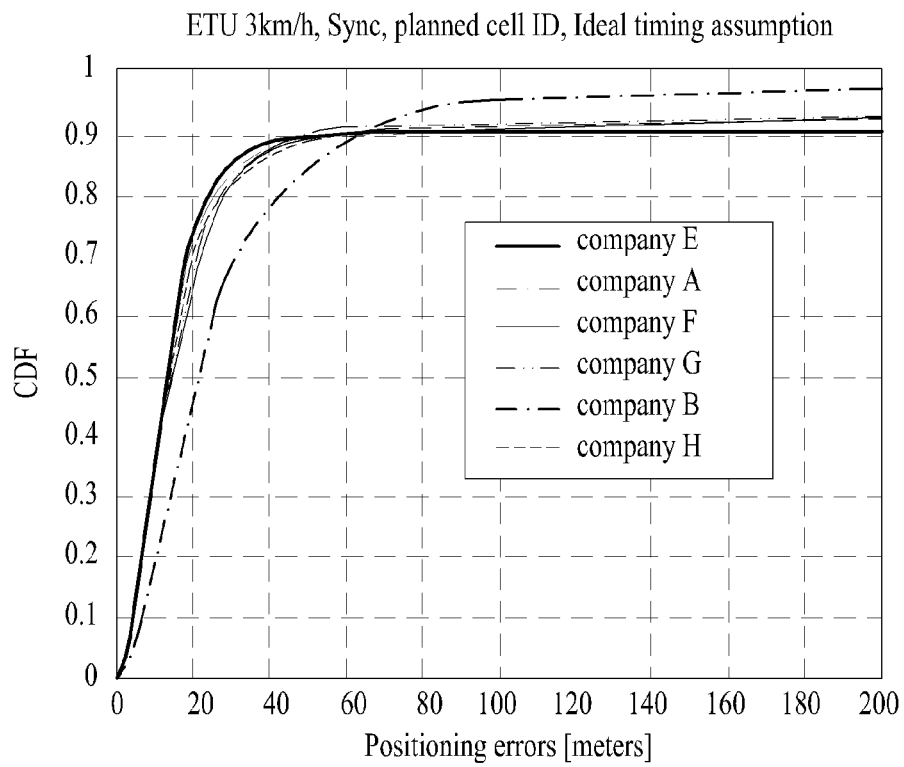
FIG. 46 shows a result of comparison of performances for different PRS patterns on ideal timing assumption.

FIG. 46 shows a result of performance comparison of different PRS patterns on ideal timing assumption. Referring to FIG. 46, timing accuracies for the different PRS patterns are not different from each other because of a narrow timing measurement window.

The pattern of company B has position determination accuracy lower than those of other companies because of low symbol energy (two OFDM symbols in one subframe). However, interference for a resource element given in one cell is mitigated when cell ID planning is applied.

Hearibility from a fractional reuse based pattern is slightly lower due to larger frequency reuse 12.

The ideal timing assumption cannot reflect characteristic of auto correlation profile from different PRS patterns.

Figure 47:
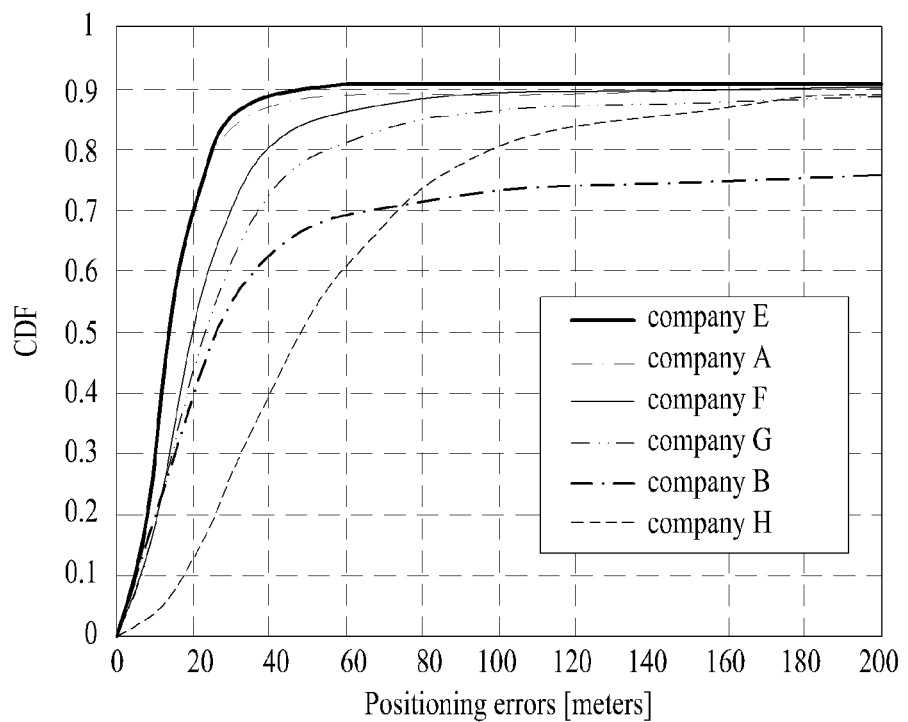
FIG. 47 shows a result of comparison of performances for different PRS patterns on practical timing assumption.

FIG. 47 shows a result of performance comparison of different PRS patterns on practical timing assumption.

Referring to FIG. 47, it is apparent that orthogonal reuse based patterns (company A and company E) show the best performance because of better auto correlation profile (no null subcarrier is present in a subframe). The pattern of company B has the worst performance because of auto correlation profile having low energy due to null subcarrier and time reuse. For the pattern of company A, an orthogonal PRS pattern seems to collide with a PRS pattern of a neighbor cell for all PRS elements having different propagation delays.

Position determination performances of fractional reuse based patterns (company F, company G, and company H) are poorer than that of the orthogonal reuse based pattern due to poor auto correlation profile.

Since planning is performed in consideration of collision between CRS and PRS, the pattern of company F shows the best position determination performance.

The proposals have different null subcarrier locations, and thus auto correlation profile depends on null subcarrier.

When Es/Iot threshold value is determined from a pattern according to a false alarm rate, hearibility is not actually increased.

The practical timing assumption can affect the auto correlation profile effectively from different PRS patterns.

Figure 48:
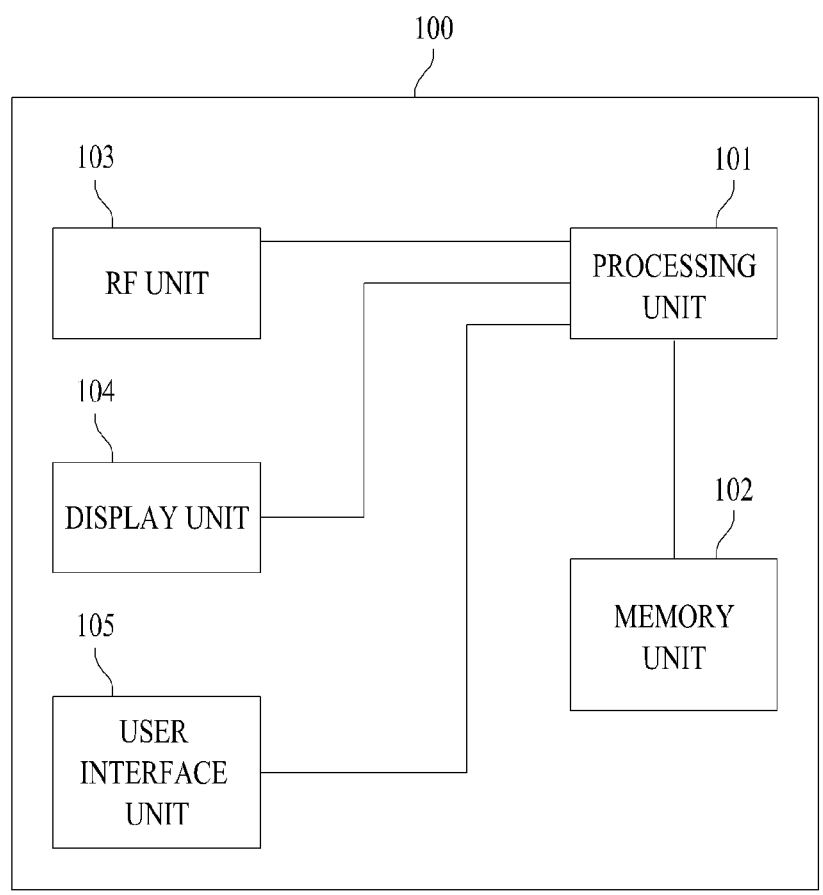
FIG. 48 is a block diagram of a device capable of being applied to a base station and user equipment and performing the method of the present invention.

FIG. 48 is a block diagram of a device capable of being applied to a base station and user equipment and performing the above-described methods. Referring to FIG. 48, the device 100 includes a processing unit 101, a memory unit 102, an RF (Radio Frequency) unit 103, a display unit 104, and a user interface unit 105. A physical interface protocol layer is processed in the processing unit 101. The processing unit 101 provides a control plane and a user plane. A function of each layer can be executed in the processing unit 101. The processing unit 101 can perform the above-mentioned embodiments of the present invention. More specifically, the processing unit 101 can generate a subframe for user equipment position determination or receive the subframe to execute a function of determining the position of user equipment. The memory unit 102 is electrically connected to the processing unit 101 and stores an operating system, application and normal files. If the device 100 is user equipment, the display unit 104 can display various information items and can be implemented using LCD (Liquid Crystal Display, OLED (Organic Light Emitting Diode), etc. The user interface unit 105 may be combined with a conventional user interface such as a keypad, touch-screen, etc. The RF unit 103 is electrically connected to the processing unit 101 and transmits or receives RF signals.

The embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the present invention, user equipment can be replaced with a MS (Mobile Station), SS (Subscriber Station), MSS (Mobile Subscriber Station), or mobile terminal.

The user equipment can use a cellular phone, PCS (Personal Communication Service) phone, GSM (Global System for Mobile) phone, WCDMA (Wideband CDMA) phone, MBS (Mobile Broadband System) phone, etc.

MODE FOR CARRYING OUT THE INVENTION

The embodiments of the present invention can be implemented by various means. For example, the embodiments of the present invention can be implemented by hardware, firmware, software, or combination thereof.

In a hardware configuration, the embodiments of the present invention may be implemented by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention can be implemented by a type of a module, a procedure, or a function, which performs functions or operations described above. Software code may be stored in a memory unit and then may be executed by a processor. The memory unit may be located inside or outside the processor to transmit and receive data to and from the processor through various means which are well known.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

INDUSTRIAL APPLICABILITY

The present invention can be used for terminals, base stations, or other equipment of a wireless mobile communication system.

The invention claimed is:

1. A method for determining position of a user equipment in a wireless mobile communication system, the method comprising:

receiving positioning reference signals in a plurality of subframes; and measuring reference signal time difference (RSTD) between the positioning reference signals received in the plurality of subframes used for determining a position of the user equipment, wherein a pattern of the positioning reference signals corresponds to a 12×12 resource element matrix pattern, the pattern of the positioning reference signals is mapped to 12×12 resource elements specified by 12 subcarriers and 12 orthogonal frequency division multiplexing (OFDM) symbols of each of the subframes, and the positioning reference signals are not transmitted on 12 subcarriers in a OFDM symbol in which a common reference signal (CRS) is transmitted, and wherein at least 3 OFDM symbols from an initial OFDM symbol are not used for the positioning reference signals in each of the subframes regardless of a number of OFDM symbols used for a physical downlink control channel.

2. The method of claim 1, wherein a 6×6 diagonal resource element matrix pattern is repeated 4 times in the 12×12 resource element matrix pattern.

3. The method of claim 1,
wherein if the subframes have a normal cyclic prefix, OFDM symbol indexes 3 and higher are used for the pattern of the positioning reference signals.

4. The method of claim 1,
wherein if the subframes have an extended cyclic prefix, OFDM symbol indexes 4 and higher are used for the pattern of the positioning reference signals.

5. A user equipment in a wireless mobile communication system, comprising:

a receiver; and a processor, wherein the receiver is configured to receive positioning reference signals in a plurality of subframes, wherein the processor is configured to measure measuring reference signal time difference (RSTD) between the positioning reference signals received in the plurality of subframes used for determining a position of the user equipment, wherein a pattern of the positioning reference signals corresponds to a 12×12 resource element matrix pattern, the pattern of the positioning reference signals is mapped to 12×12 resource elements specified by 12 subcarriers and 12 orthogonal frequency division multiplexing (OFDM) symbols of each of the subframes, and the positioning reference signals are not transmitted on 12 subcarriers in a OFDM symbol in which a common reference signal (CRS) is transmitted, and wherein at least 3 OFDM symbols from an initial OFDM symbol are not used for the positioning reference signals in a subframe regardless of a number of OFDM symbols used for a physical downlink control channel.

6. The user equipment according to claim 5, wherein a 6×6 diagonal resource element matrix pattern is repeated 4 times in the 12×12 resource element matrix pattern.

7. The user equipment according to claim 5,
wherein if the subframes have a normal cyclic prefix, OFDM symbol indexes 3 and higher are used for the pattern of the positioning reference signals.

8. The user equipment according to claim 5,
wherein if the subframes have an extended cyclic prefix, OFDM symbol indexes 4 and higher are used for the pattern of the positioning reference signals.

9. The method of claim 1, wherein a frequency-shift is applied to the pattern of the positioning reference signals for each cell, and wherein the frequency-shift is determined based on NcellID mod 6, where NcellID is a cell identifier, and mod denotes modular operation.

* * * * *